Figure 5:
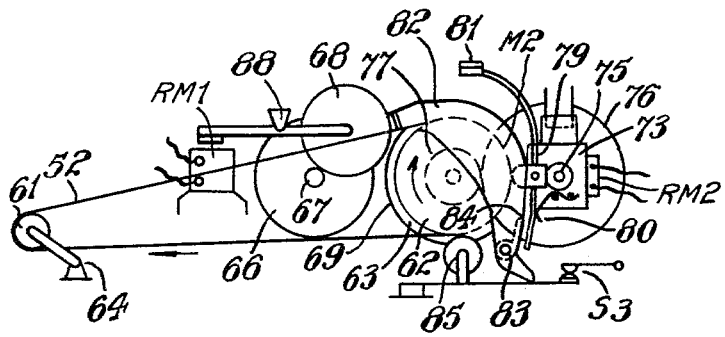

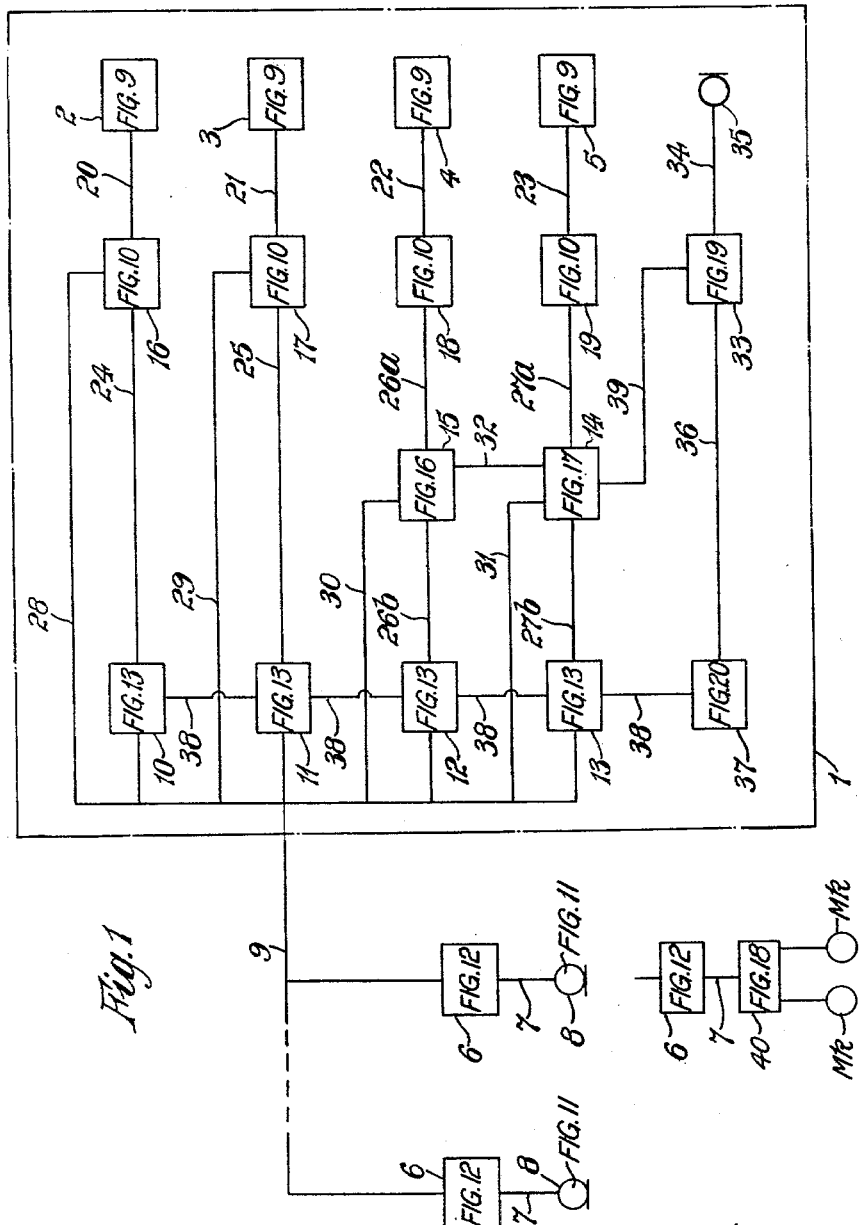

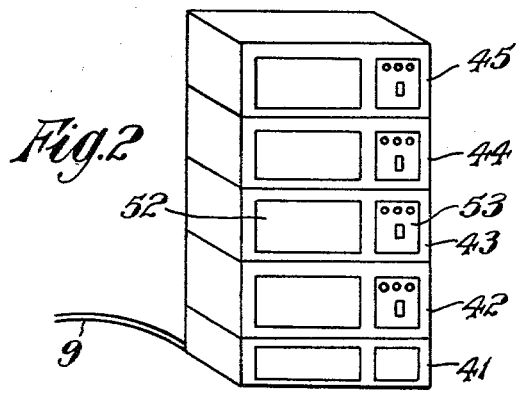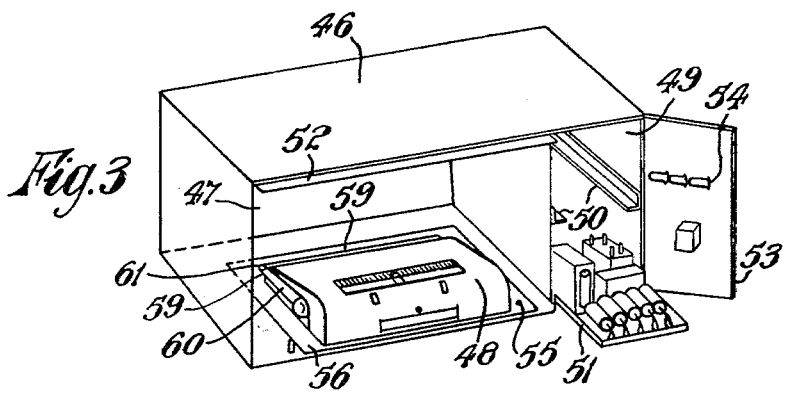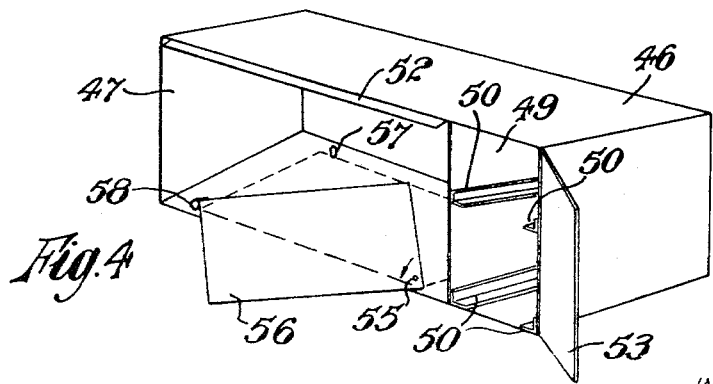

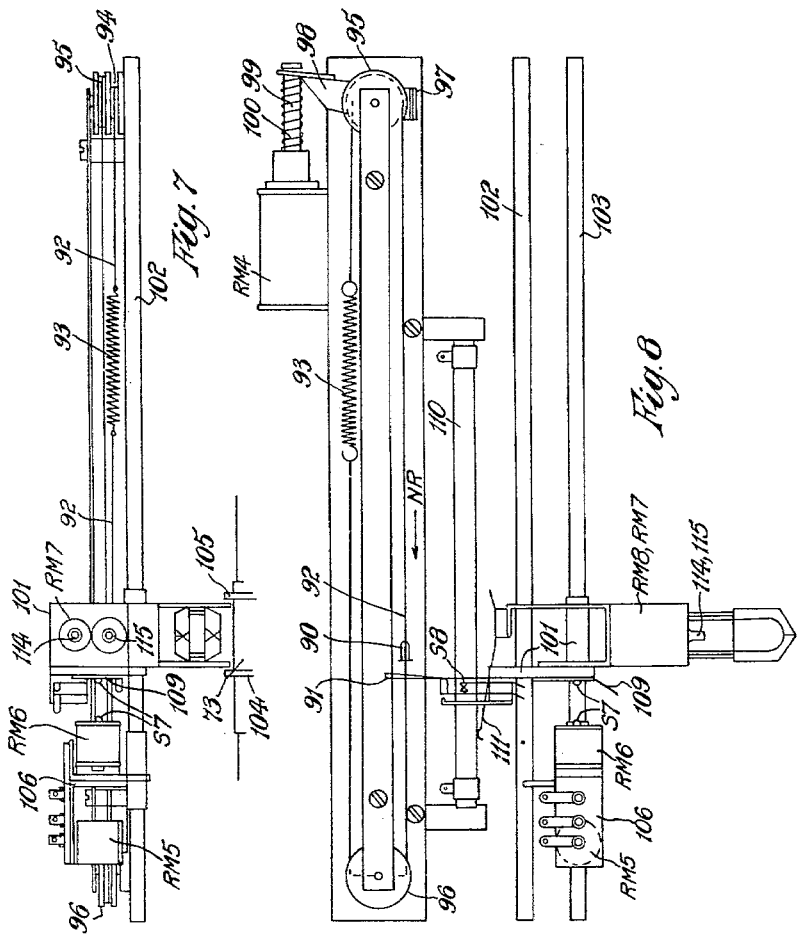

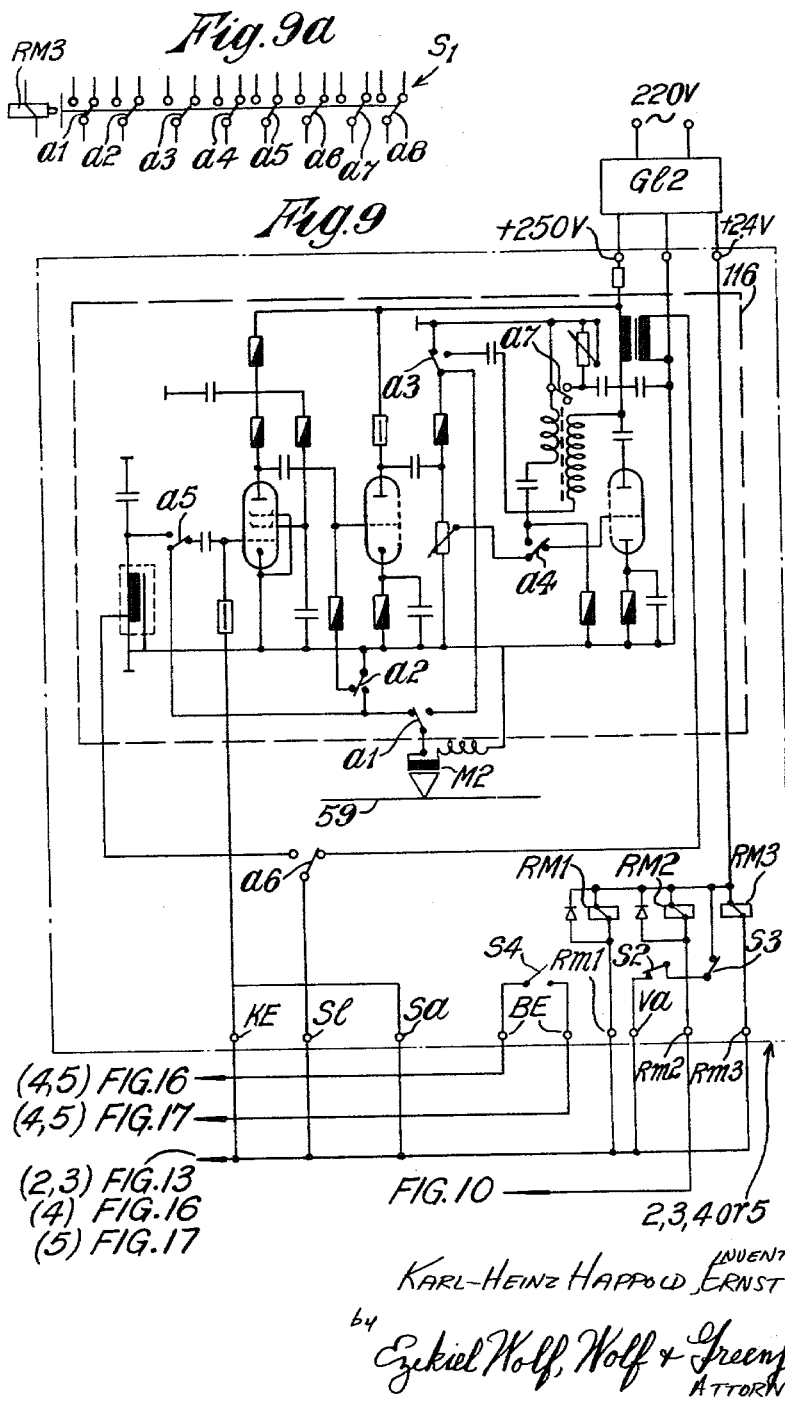

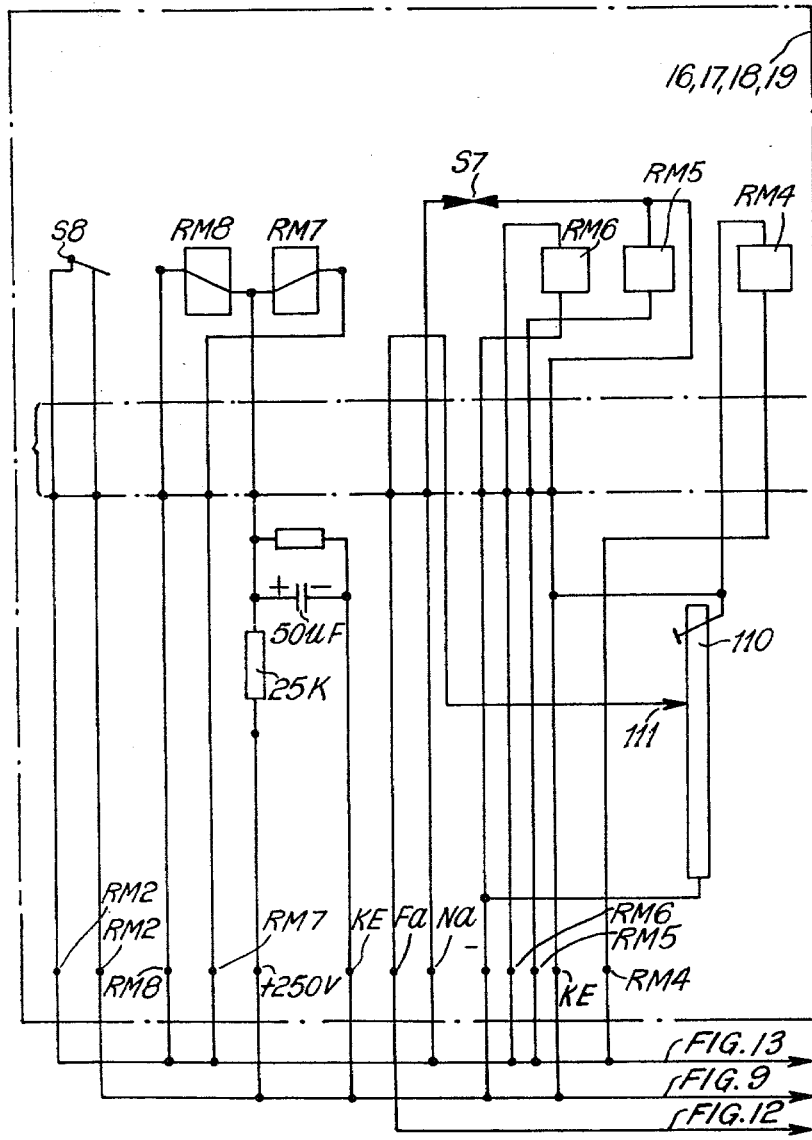

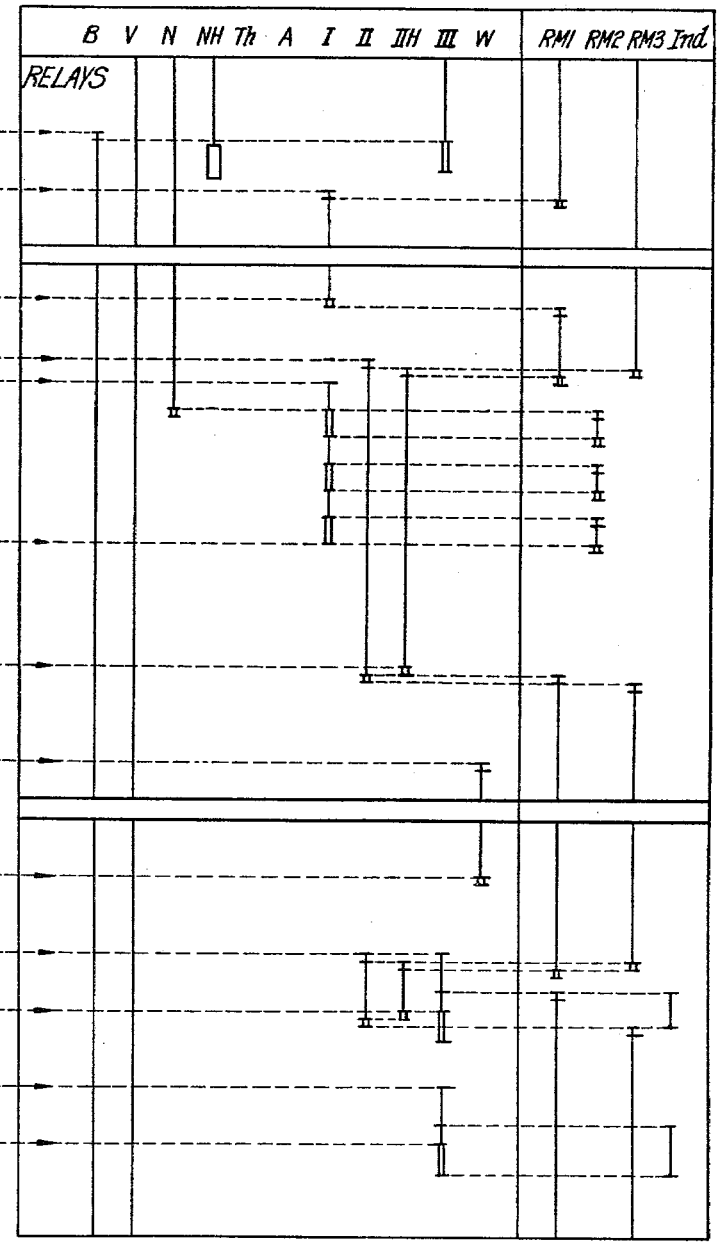

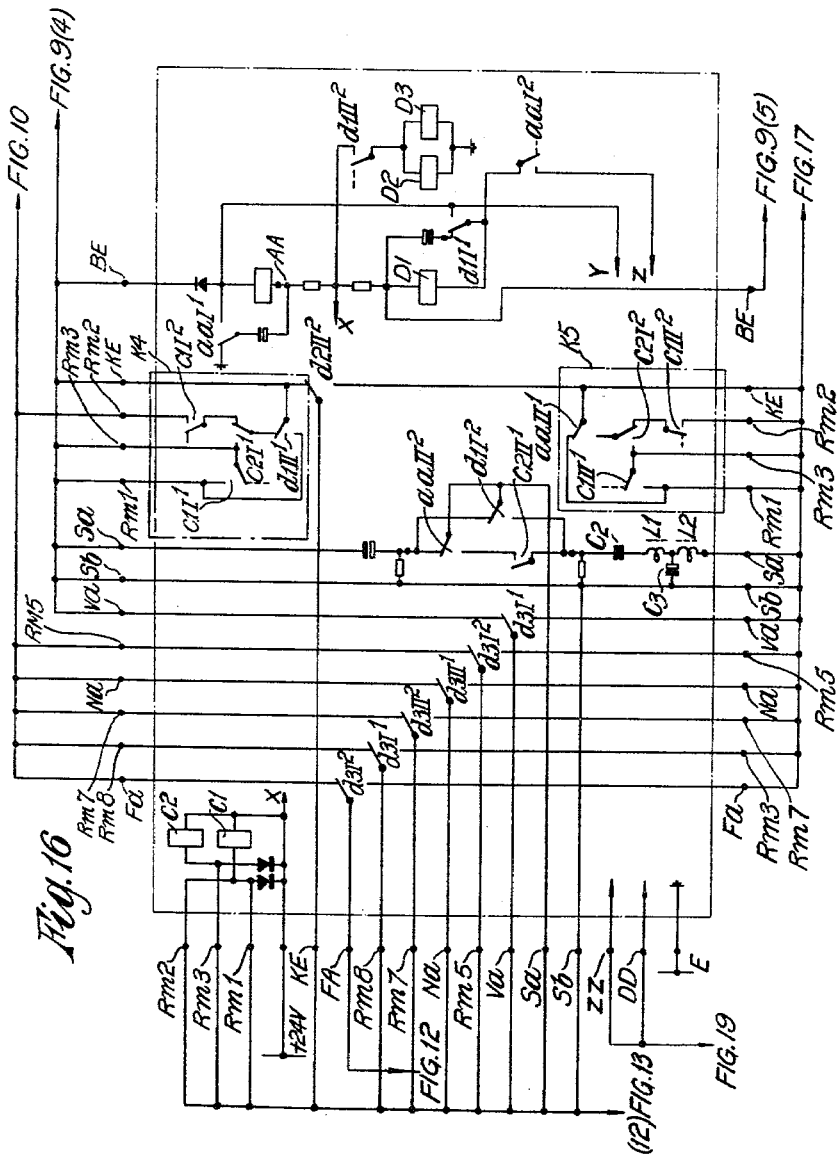

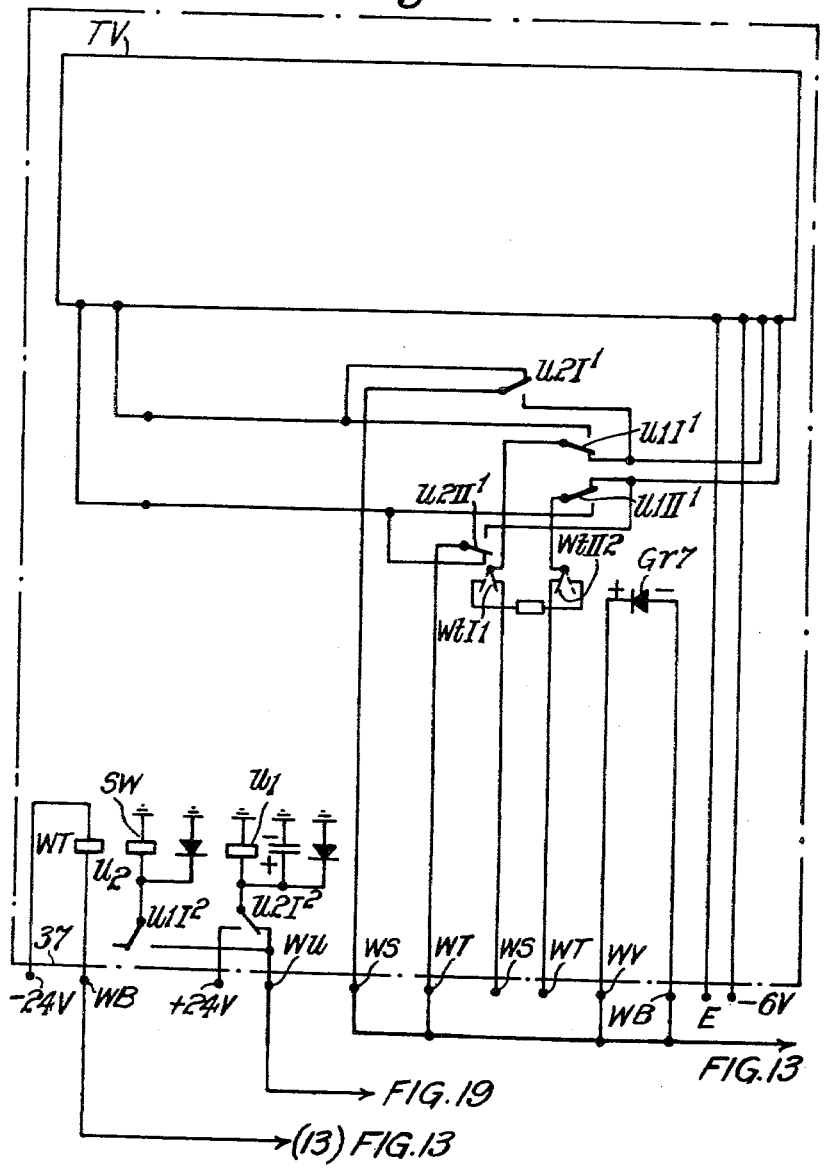

Fig. 15

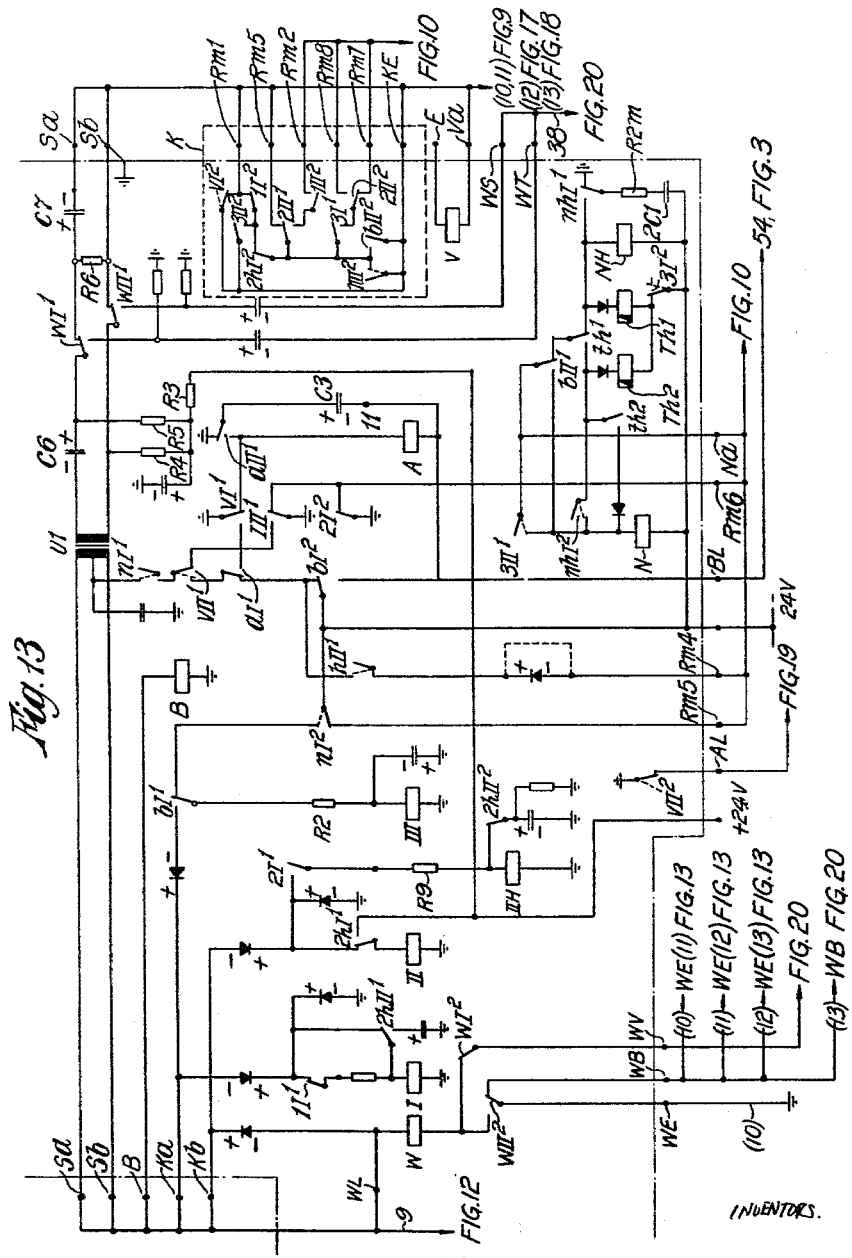

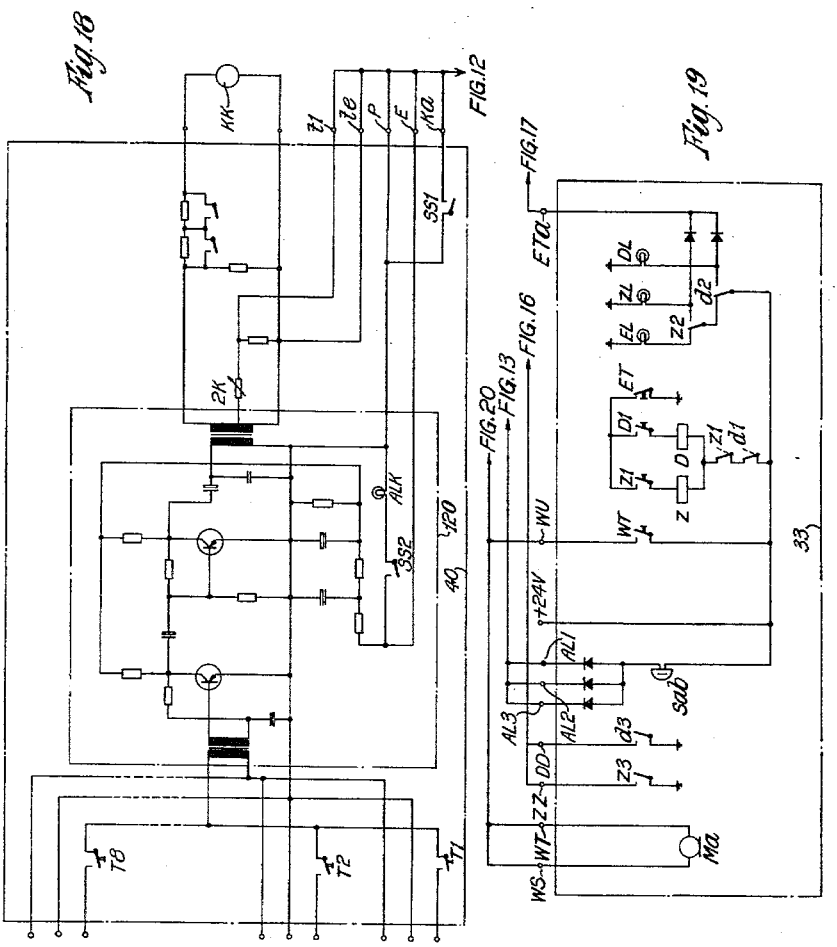

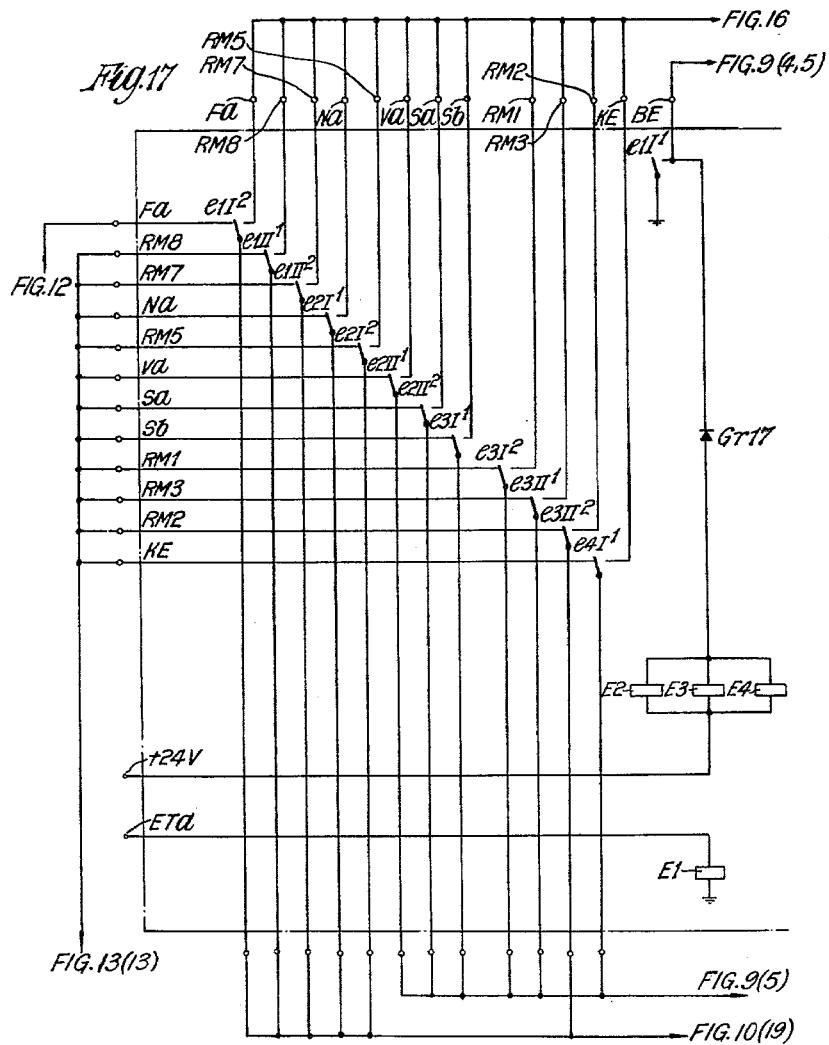

3,197,562
DICTATION INSTALLATIONS
Karl-Heinz Happold and Ernst Rose, Munich, Germany, assignors to Sud-Atlas-Werke G.m.b.H., Munich, Germany, a corporation of Germany
Filed Aug. 17, 1961, Ser. No. 133,285
10 Claims. (Cl. 179—6)

This application is a continuation in part of application Serial No. 60,219 filed October 3, 1960, now abandoned.

This invention relates to a dictating installation, particularly one having one or more dictating machines disposed in a central station and which are operated at a distance from separate dictating stations and equipped with a listening lock to cut off undesired repetition, the said lock coming into operation either as the result of a control operated by the dictating subscriber or else automatically, particularly through the termination of the use of the dictating machine. If in known installations of this type the sound head is moved back by repetition after the recording of dictation, but the dictation is not listened to as far as the end of the letter, but the sound head is stopped before the end of the letter is reached, on the termination of the use of the machine by the subscriber and its re-use by another subscriber, the possibility would exist that the other subscriber could listen to the dictation from the stop position to the end of the letter dictated. In addition there would also be a danger that through a mistake on the part of the first or the subsequent subscriber the last part of the letter would be recorded over and thus erased.

In order to obviate this disadvantage, a resetting device is provided according to the invention, through which the dictating machine is automatically returned to its starting position after repetition, if this has not already been done. This measure is advantageously applicable with a dictating installation having a central exchange and remote control by the different subscribers of the dictating machines provided in the exchange, and also to individual dictating machines. The resetting device can be so constructed that it comes into operation after the operation of the repetition or termination of the use of the dictating machine. It advantageously works in such a manner that it comes into operation after every repetition, irrespective of whether the use of the machine is continued or terminated. In addition it is advantageous to provide an additional resetting device, by which the dictating machine is automatically run a certain distance beyond the end of the dictation after termination of the use by a subscriber. The certainty of the operation of the listening lock is thereby also ensured when certain tolerances in the operation of the different elements of the plant have to be taken into account. When changing tapes, the listening lock is advantageously automatically returned to the zero position.

In a machine with line recording, for example after the style of a disc record or with a recording on an endless belt, the return of the listening lock to the first line can be automatically coupled to the return of the sound head to the first line which takes place in such machines. In particular for such dictating machines working with line recording, it is advantageous for their return to the starting line in the case of the changing of the tapes, that is to say the return of the sound head to the starting line, to be carried out automatically, quite irrespective of whether the dictating machine is furnished with a listening lock or not. The automatic return of the sound head in line recording dictating machines, when these are disposed in a central exchange and controlled by table stations at a distance, is particularly important. In dictating machines with a coupled listening lock, the advantage exists that the automatic return of the listening lock to the first line is automatically connected with the automatic return of the sound head to the starting line.

A further substantial facilitation of operation can also be achieved in dictating machines with step switch return or step switch repetition, by providing a device for automatically continued step switching. A device of this type is important not only in connection with the listening lock or with the remote control of dictating machines disposed in a central exchange, but can also advantageously be used in conjunction with a single dictating machine as a table instrument. Step switch repetition is generally provided only in dictating machines with line recording, because the sound head is then displaced transversely to the sound tracks and can be moved by step switching from track to track. Naturally it would however also be conceivable in the case of dictating machines with a narrow tape and a single sound track to provide step switch repetition, and in this case also use could advantageously be made of the automatically continued step switching. In dictating machines with a listening lock by automatic resetting according to the present invention, the automatically continued step switching will advantageously be automatically released again on the changing of the tape and will be coupled with the return of the listening lock to the first line, so that the listening lock and the sound head return together to the starting position.

In dictating machine installations having a plurality of dictating machines disposed in a central exchange and operated from a distance from separate dictating stations, it is important for the friction-free running of the installation to avoid double occupation of dictating machines. According to the invention this can be achieved by associating with each dictating machine or each dictating machine unit a locking collective line taken to all subscribers which supplies the busying energy necessary for the busying and which after the busying has been effected is switched off from the source of busying energy. Simultaneous multiple busyings are thereby also avoided, one busy switch being provided for each subscriber in the common locking line in such a manner that of a plurality of simultaneously operated busy switches in each case only one switch can effect the busying operation, preference being given in the sequence of serial arrangements; for example the busy switches may be disposed serially in the locking collecting line in such a manner that a busy switch situated nearer the source of busying energy when operated renders ineffective the busy switches situated at a greater distance from the source of energy.

A substantial facilitation of operation can be achieved if the dictating microphones of the individual stations form a part of a duplex or intercommunication installation between the exchange and the dictating station, while by similar measures as for the double busying lock, simultaneous occupations of the intercommunication system by different subscribers can also be avoided.

Moreover, with dictating central exchanges it is advantageous, according to the invention, to provide an apparatus for notifying the connected subscriber of the position of the respective dictating machine.

If dictating machines of the exchange are provided, as is known per se, with an apparatus for the indication on an index of correction points, according to the invention this device can be so constructed that on the termination of the occupation of the machine the position of the sound head at the end of the dictation, where applicable after automatic resetting according to the invention, is automatically marked on the index strip. The index device can be so constructed that although it comes into operation automatically for the marking of the end of the dictation, it can also be controlled from the distant station.

The operation of the index device can be improved by providing for the production of the index pulses an energy storage element, for example a capacitor, which is discharged on the initiation of the pulse. In addition, the energy producing the index can be further increased by having the markings made by an electro magnet the armature of which is provided with an additional mass, in order to utilise the kinetic energy when the index is moved into the index strip.

For usability of a dictating central exchange with remote-controlled dictating machines it is important to keep as small as possible the expenditure for the line connections between the exchange and the table stations. In order to achieve this, according to the invention the intercommunication traffic can pass through the same core as the transmission to and from the dictating machine, these cores being connected under the control of the subscriber as desired to the dictating machine or to the supervising station in the exchange.

Release or occupation of the speech cores are advantageously connected through a phantom line with the utilization, which is known per se, of a middle tapping of transmitters at the beginning and end of the line. In this way it is possible also to give them the "free" criterion or "occupied" criterion to the two speech cores.

Moreover, the number of the cable cores can be reduced by multiple utilization of the control cores leading to the exchange for the control of the dictating installation by the subscribers, by the use of rectifiers and of positive and negative control voltages. Finally, according to the invention a very substantial improvement of the dictating exchange plant can be achieved by connecting together at least two of the dictating machines disposed in the dictating exchange to form a dictating unit, in such a manner that they come into operation alternately and can be used as a result for continuous dictation, such as is required particularly for the recording of conferences. According to the invention, these two dictating machines can also be connected to an apparatus which enables them to be switched over to parallel operation for the purpose of making a second recording. In addition, another change over apparatus can be used for the purpose of changing over to individual use of the machines when desired, so that they can be used independently of one another.

The last described arrangement for the use of two dictating machines in a conference connection, for the two recordings, or for use as separate machines, as required, can also advantageously be applied to normal operations, i.e. without an exchange with remote control.

Figure 6:
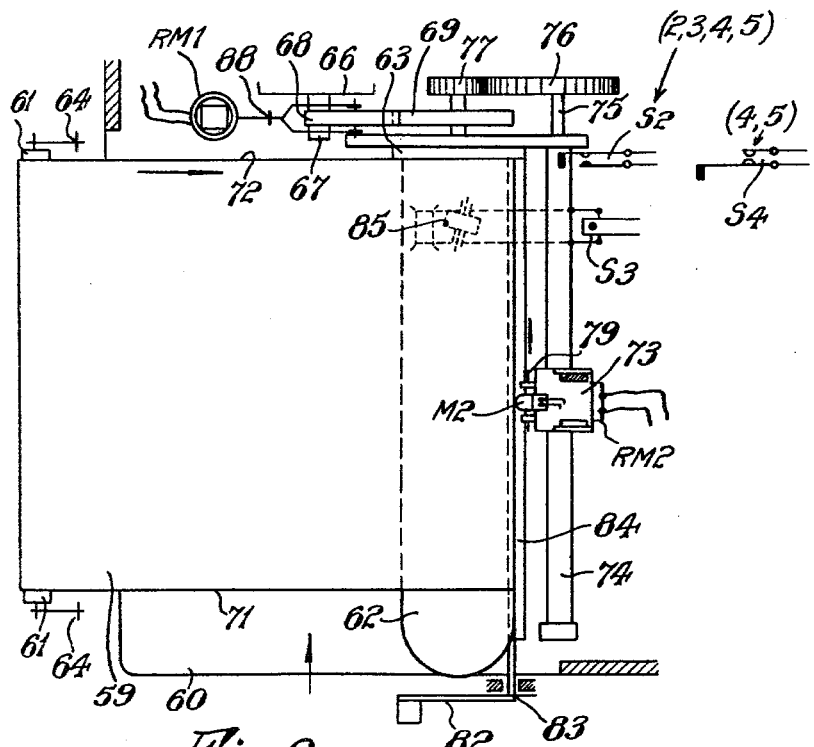
Figure 11:
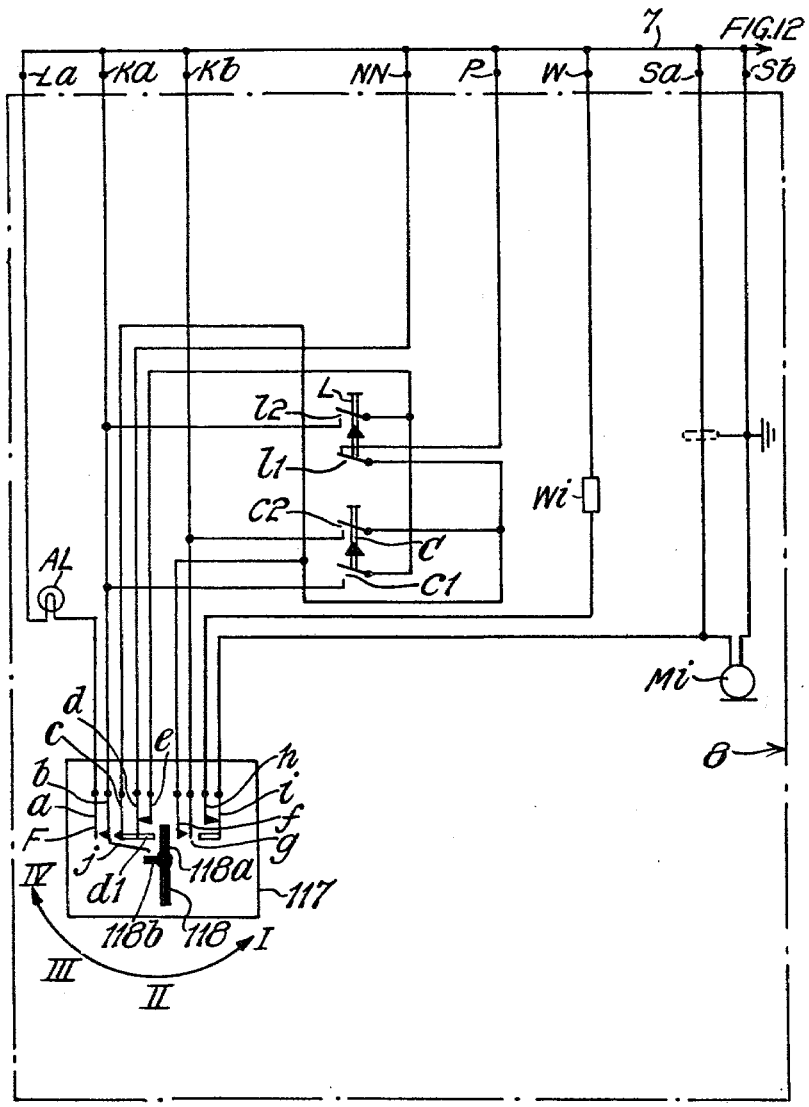
Figure 12:
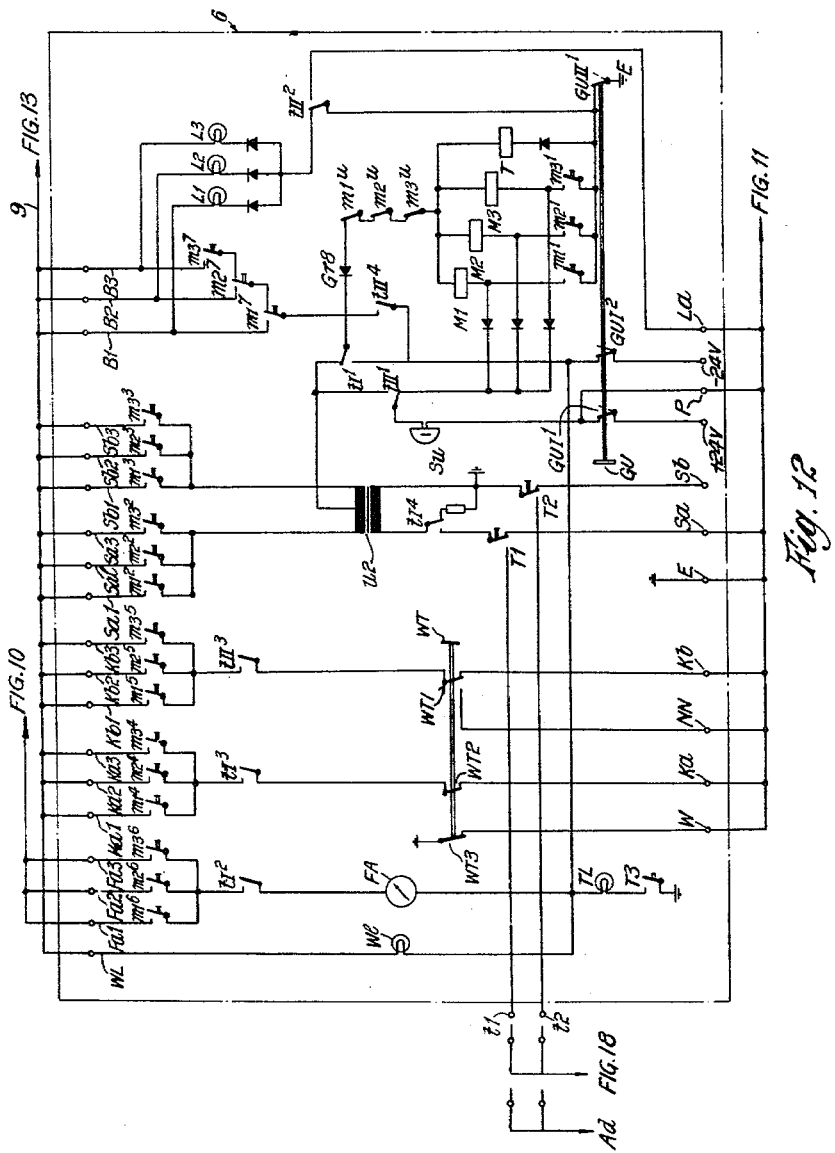

The invention will now be explained by way of example with reference to the accompanying drawing, in which:

FIGURE 1 shows the block diagram of a dictating machine plant according to the invention, with any desired number of table stations, and a dictating exchange with four dictating machines, FIGURE 2 shows a view in perspective of the dictating exchange, FIGURE 3 shows a view in perspective of a structural unit of the dictating exchange, in the open position, FIGURE 4 shows a view in perspective of the housing of a structural unit, in the open position, FIGURE 5 shows a side view of the mechanical part of a dictating machine, shown diagrammatically, FIGURE 6 is a plan view corresponding to FIGURE 5, FIGURE 7 shows on a larger scale the mechanical part for a listening lock, remote indication, and indexing in the dictating machine shown in FIGURES 1 and 2, in a front elevation, FIGURE 8 a plan view corresponding to FIGURE 7, FIGURE 9 the electric diagram of a dictating machine, FIGURE 9a the record-play back switch from FIGURE 9, FIGURE 10 the wiring diagram of an index unit associated with each dictating machine and having a listening lock and remote indicator, FIGURE 11 the wiring diagram of a subscriber and microphone, FIGURE 12 the wiring diagram of a table station, FIGURE 13 the wiring diagram of a control set, allocated to each dictating machine, in the dictating exchange, FIGURES 14 and 15 a relay diagram illustrating the mode of operation of the control set illustrated in FIGURE 11, FIGURE 16 the wiring diagram of the apparatus, shown as a block unit in FIGURE 1, for changing over to conference operation or double recording operation with two dictating machines, FIGURE 17 the wiring diagram of the unit illustrated in FIGURE 1 as a block unit for changing over the two dictating machines, provided for conference and double recording operation, to individual operation, FIGURE 18 the wiring diagram of the supplementary apparatus for conference operation illustrated as a block unit in FIGURE 1, FIGURE 19 the wiring diagram of the supervisory station illustrated as a block unit in FIGURE 1, and FIGURE 20 the wiring diagram of the amplifier, shown as a block unit in FIGURE 1, for intercommunication between the exchange and subscribers.

The dictating machine installation illustrated by way of example in the drawing consists, as can be seen from the block wiring diagram in FIGURE 1, essentially of an exchange 1 for four dictating machines 2, 3, 4, 5 (FIGURE 9) and any desired number of speaking points in the form of table stations 6 (FIGURE 12), which are connected through respective cables 7 to respective microphones 8 (FIGURE 11) and through a common multi-conductor cable 9 to the exchange 1. In the exchange the control leads of the multi-conductor cable 9 are each connected in parallel to control sets 10, 11, 12, 13 (FIGURE 13) for the dictating machine units 2, 3, 4, 5 (FIGURE 9) respectively. The dictating machine units 4 and 5 can be used if desired, like the machines 2 and 3, as individual dictating machines, but, unlike the machines 2 and 3, they can also be used in a conference connection alternately or in a copying connection for double recording on their two sound carriers. For the purpose of changing over to these three different modes of operation, an individual machine change-over unit 14 (FIGURE 17) and a conference change-over and double recording unit 15 (FIGURE 16) are provided. Each of the dictating machines 2, 3, 4, 5 also has associated with it an auxiliary device 16, 17, 18, 19 (FIGURE 10) respectively, each of which devices is hereinafter referred to as an index unit, which is connected on the one hand through lines 20 to 23 to the dictating machines 2, 3, 4 or 5 respectively, and one the other hand through lines 24, 25, 26a+26b, 27a+27b to one of the four control sets 10 to 13. The line 26a connects the index attachment of the machine 4 to the unit 15, and the line 26b connects the unit 15 to the control set 12. In addition the index unit 19 of the machine 5 is connected through the line 27a to the individual machine change-over unit 14. The unit 14 in turn is connected through the line 27b to the control set 13.

The index units 16, 17, 18, 19 are connected in parallel for the purpose of remote indication through lines 28, 29, 26a+30 and 27a+31 and the main cable 9 to the table stations 6. For the conference arrangement, a connection 32 is also provided between the unit 14 and unit 15. Finally, a supervisory station 33 (FIGURE 19) is also provided in the exchange, and is connected through a cable 34 to a microphone 35 and by a line 36 to the table stations 6 (FIGURE 12) by way of an intercommunication amplifier 37 (FIGURE 20), a line 38, and the control set 13. The supervisory station 33 is provided with a control line 49 to the change-over unit 14 (FIGURE 17) for changing the dictating machines 4, 5 over to the three different modes of operation: individual operation, conference operation, and dual recording operation.

For conference operation a conference control device 40 (FIGURE 18) is also to be inserted between the table station 6 of the subscriber from whom the machines 4 and 5 are to be used in conference connection, and the microphones Mr connected thereto.

Hereinafter the individual elements of the block diagram illustrated in the block diagram in FIGURE 1 will now be described in greater detail in their construction and mode of operation.

As illustrated in FIGURE 2, the dictation exchange 1 is constructed of a series of construction units which have the same ground contour and which are united by simply being placed one on the other to form an integral frame. The lowermost construction unit 41 can contain the mains apparatus part and the amplifier 37 necessary for operating the supervisory station 33, while the construction units 42 to 45 situated thereabove are completely identical with one another in construction and each contains one of the dictating machines 2, 3, 4, 5 with the associated index units 16 to 19 and the control sets 10 to 13. The units 14 and 15 are also accommodated in the construction units 44 and 45.

The construction units 42 to 45 have separate housings 46 with the same dimensions and the same construction (see FIGURES 3 and 4). Each housing 46 is sub-divided into two chambers 47 and 49. The left-hand larger chamber 47 serves to receive a dictation machine 2, 3, 4, or 5 with a hood 48 (normally removed for the purpose of mounting the index unit 16, 17, 18, or 19). The right-hand chamber 49 is furnished with guides 50 for two inserts 51 (only one insert being shown). One of the control sets 10 to 13 forms one of the two inserts and the individual machine change-over unit 14 or the conference and double recording unit 15 forms the other insert. The second insert 51 is therefore provided in the embodiment shown in the figures only in the construction units 42 and 43 for the dictating machines 4 and 5 which are intended to be switched over to different modes of operation. The two chambers 47 and 49 are accessible from the front side of the construction unit and for this purpose are provided with doors 52 and 53 respectively. The door 52 for the left-hand chamber 47 is constructed as a rocking sliding door and can be pushed under the ceiling of the chamber. The door 53 for the right-hand chamber 49 on the other hand is constructed as a swinging door and carries on operating lamp control panel 54 appertaining to the construction unit in question.

In order to facilitate operation when changing the recording tapes by the supervisory person in the exchange, there is provided in the left-hand chamber 47, for the purpose of receiving the dictating machine, a stand plate 56 which can be rocked out forwards in the anti-clockwise direction about a vertical axis 55. The turning travel for this stand plate is so limited by stops 57 and 58 that the opening 60 provided on the left-hand side of the dictating machine 2, 3, 4, or 5 for the insertion of a recording belt 59 and the tensioning roller 61 which can be swung down for the purpose of tensioning the recording belt introduced, are easily accessible. The rocking out of the insertion side of the dictating machine not only affords the advantage of particularly simple operation, but is also important for the standing stability of the exchange, because through this rocking, in contradistinction to a simple pulling out of the dictating machine on a slidable stand plate, only a slight displacement of weight takes place. The construction units are furthermore equipped, in a manner not visible in the drawing, for the passing through of the connecting cables of the machine parts accommodated in them to the common main cable 9, which runs from the exchange 1 to the individual table station 6.

The above-described construction of the exchange is distinguished by easy supervisability, compact construction, and good adaptability, as well as convenient for attention and operation. Through the insertion type of construction for the control sets and switch units of the exchange, there is rapid exchangeability of defective construction units or dictating machines. The dictating machines can be switched on and off through a common main switch. Through the construction unit system it is easily possible to extend the exchange by adding further construction units up to such a number of dictating machines as corresponds to the upper limit imposed by the dimensions of the common mains apparatus.

The dictating machines will now be described in greater detail. FIGURES 5 to 8 show diagrammatically the general mechanical construction of the dictation machine with the contacts and electromagnets necessary for its control.

The recording belt 59 is pushed through the housing opening 60 situated on the left-hand side of the machine in the direction of the arrow on to an overhung driving roller 62 until it strikes against a collar 63 on the roller. The belt 59 is tensioned by a guide roller 61 rockable about a horizontal axis 64. The roller 62 is driven by a motor 66 through friction wheels 67, 68, 69, so that during the recording and reproduction of the dictation the endless belt 59 moves with uniform speed past a sound head M2 slidable parallel to the axis of the roller 62, the said sound head being used during recording as a speech head and during reproduction as a listening head. During this time the sound head M2 moves slowly in the direction of the arrow from the front edge 71 to the rear edge 72 of the belt 59 along a surface line of the roller 62. The sound head is for this purpose mounted on a slide 73, the sound head slide, being non-rotatably and axially slidable on a tube 74. The slide 73 is driven by a spindle 75 enclosed by the tube 74, the spindle being coupled through gear wheels 76, 77 to the axis of the roller 62. The spindle 75 is in engagement with a coupling element, for example a gear wheel which is secured against rotation during recording and reproduction and which through a slot in the tube 74 engages in the spindle. The said gear wheel may be turned back by one tooth division at a time, corresponding to a sound track, by means of a step switch mechanism which itself is mounted on the slide 73, in order to adjust the sound head M2 against the direction of the arrow for the purpose of repetition. This step switch mechanism is operated by an electromagnet RM2, which is situated on the slide 73. This electromagnet can also be energized by an automatically repeated train of impulses in a manner which will be explained in detail below in the description of the circuit arrangement, so that a continuous step switching of the sound head in the direction opposite to that of the arrow takes place. This return for the purpose of repetition can be effected as far as a predetermined point in the dictation recorded, or else as far as the front edge 71 of the belt 59 for the purpose of changing the belt. The sound head M2 is rockable on the slide 73 about a horizontal axis 79 and is under the influence of a spring 80 which attempts to hold it in contact with the roller or the belt 59. By the depression of an operating button 81, the sound head can be raised from the roller and moved together with the slide 73 in one direction or the other. The coupling element between the slide 73 and the spindle 75 is also so connected to the sound head holder that the coupling between these two parts is interrupted simultaneously with the lifting off of the sound head from the roller.

The opening 60 for the belt 59 is locked during operation by a locking lever 82. On the release of the locking lever by turning it about its axis 83, the sound head holder is rocked about its axis 79 by means of a cam strip 84 connected to it and extending over the entire length of the roller, and thereby the sound head is lifted off from the roller. At the same time an inclined friction roller 85 bearing against the belt 59 on the rollers 61, 62 is lifted off from the roller, the said friction roller 85 serving to produce a constant thrust force on the belt 59 in the direction of the stop collar 63. The effect is thereby achieved that the sound head M2 and the inclined friction roller 85 do not constitute a hindrance to the changing of the belt 59 after the unlocking of the insert aperture.

Through the cam strip 84 moreover a contact S3 is also opened which in a manner to be described in greater detail hereinbelow serves to check the correct closing of the lock 82 and hence the correct operating position of the sound head M2 and inclined roller 85.

In the path of the slide 73 end contacts S2 are provided which at the end of the band or shortly before the end of the band operate a circuit for indication or control. The dictation machines 4 and 5 are also equipped with additional end contacts S4. For the sake of clarity, these are removed from the path of the slide 73 in FIGURE 6 of the drawing.

The running of the belt 59 can be switched on and off by depressing or lifting the wheel 68 rockably mounted about an axis 88. The wheel 68 acts as a ratchet and is held by its own weight in the coupling position, i.e. the running position, and can be lifted off by an electromagnet RM1.

In a manner to be described in detail below, the dictations of different subscribers can be recorded in succession on the belt 59. In order to prevent dictations being heard by other subscribers by repetition, the dictating machines are equipped with listening locks. In the example illustrated, this listening lock is formed by a mechanical return lock for the dictating machine. As can be seen in FIGURES 7 and 8, this return lock consists essentially of a stop 90 which is movable parallel to the sound head slide 73 and lies in the path of an arm 91 rigidly coupled to the slide. This stop 90 is so controlled that after termination of the occupation of the dictating machine by a subscriber it is moved into a new position corresponding to the length of dictation of the said subscriber and the return of the slide beyond that position is prevented by the opening of a cable switch S8, which prevents connection to the repetition magnet RM2. The stop 90 is fastened on a cable line 92 in which a spring 93 is inserted and the ends of which are so connected in opposite directions to rollers 94 and 95 of different diameters that on movement in the following direction shown by the arrow NR in FIGURE 8, the spring is relieved of stress and on the return movement it is stressed again. The two rollers 94 and 95 are at the same time disposed co-axially to one another and non-rotatably connected to one another. At the other end of the cable line 92 a simple reversing roller 96 is provided. In order to prevent the stop 90 from continuously following the stop arm 91 under the action of the spring 93, the cable line is under the influence of a normally operative brake shoe 97 carried on an arm 98. By means of a brake release magnet RM4 having an armature 99, the brake shoe 97 can be released against the action of a return spring 100, after which the spring 93 is relieved of stress until the stop 90 runs behind the slide arm 91.

If after the recrding of a dictation the beginning of the recording is listened to again by repetition and the use of the dictating machine is terminated before the end of the letter is reached, the sound head slide 73 does not remain stationary in the middle region of the dictation recorded, but returns to the end of the dictation. In order to achieve this automatic resetting, a pull-slide 106 is provided.

The stop arm 91 is situated on a separate slide 101, hereinafter referred to as the index slide, which is slidable on guide bars 102, 103 extending parallel to the direction of movement of the sound head slide 73. The index slide 101 is rigidly coupled to the sound head slide 73 by engagement between two projections 104, 105 on the said slide.

The pull-slide 106 is driven during the forward running of the sound head slide 73 or index slide 101 and remains in the position into which it has been moved even though the sound head slide is moved in the reverse direction. In other words the pull-slide defines the position of the sound head slide at any stage during dictation so that the sound head slide can always be returned to the position on the band 59 which marks the end of a recorded passage.

At the beginning of the playing back, a retaining magnet RM5 which is mounted on the pull-slide 106 is energised. The magnet RM5 magnetically holds the slide 106 fast on its guide rod 103 in the position corresponding to the end of the respective dictation until the sound head slide 73 and the index slide 101 have moved on to the position of the end of the dictation. In the common advance of the sound head, index, and pull-slides the energisation of another magnet RM6 mounted on the pull-slide 106 ensures that the pull-slide 106 and index slide 101 remain closely connected together, and that unintentional moving apart of the two slides, for example through vibrations, cannot occur, and that on the manual return of the sound head (belt change) the pull-slide is likewise returned to the starting position.

When the sound head slide 73 or index slide 101 has reached the end of the dictation marked by the pull-slide 106, a starting contact S7 on the index slide is closed. Although at this moment the resetting movement to the starting position at the beginning of he play-back is ended in itself, the movement of the sound head slide and index slide is however not yet ended, but on the contrary the arrangement is so constructed that after the described automatic resetting at the end of the dictation another constrained resetting of the sound head slide 73 takes place, so that the latter comes to rest only a certain distance on the other side of the end of the dictation. The electrical control means provided for this purpose will be described further below in the explanation of the electrical equipment of the dictating machine plant.

For the purpose of indicating the respective position of the sound head slide 73, a slide resistance 110 is disposed parallel to the path of movement of the said slide 73. A sliding contact 111 connected to the index slide 101 moves relative to the resistance 110. The contact 111 receives an electric voltage corresponding to the position of the sound head M2 on the belt 59.

Finally there is also provided on the index slide 101 a device by which markings can be made on an index strip not shown in the drawing, for the purpose of indicating correction points or the end of the letter. The device includes two electromagnets RM7, RM8, the armatures 114 and 115 of which are in the form of punches so that correction markings or letter end markings can be made in the index strip in the form of perforations.

The entire device illustrated in FIGURES 7 and 8 is constructed as a unit which after removing the hood 48 (FIGURE 3) can be simply placed on an existing dictating machine so that the index slide 101 engages by its bottom projections in the fork 104, 105 of the sound head slide 73 and the device is thereby coupled fast to the sound head slide 73.

The remainder of the electrical equipment, as provided in the dictating machine for carrying out the various functions (see FIGURE 9) will now be described.

As already stated above, the dictating machine serves both for recording and for reproducing dictation and for this purpose the same sound head M2 is used. For reproduction, the voltages produced in the sound head by the belt 59 have to be amplified in an amplifier 116 and fed in a manner to be explained in detail below to the microphone of the particular subscriber who is connected to the apparatus. During dictation on the other hand, the speech voltages produced by the microphone 8 of the subscriber are conversely to be fed through the amplifier 116 to the sound head M2. For this changeover from reproduction to recording, the switching over of the amplifier is necessary this being done by an electromagnetically operated recording playing back switch 9S1 (A–W switch) with recording-playing back relay RM3 (A–W relay) (see FIGURE 9a). This A–W switch 9S1 is provided with seven contacts $a1$ to $a7$, as can be seen from the wiring diagram of the amplifier and the illustration of the switch 9S1 in FIGURE 9a. The switch position shown in FIGURE 9 corresponds to the playback position.

The A–W relay RM3, the start-stop magnet RM1 and the repetition magnet RM2 co-operate for the purpose of bringing about the various operating conditions—stop —play-back—recording, and repetition, these three relays being so controlled that the apparatus is switched over from the position of rest or stop position in which the machine had stopped recording, in which the machine is switched to recording and runs, or to play-back in which the machine is switched over to play-back and runs, and then through the play-back position to repetition or return, in which the machine is switched to play-back and repeats once. The switching over of the dictating machine is controlled by an operating switch 117 attached to the subscriber's microphone 8 (FIGURE 11), and in which the switching fuctions necessary for exciting the three electromagnets RM1, RM2 and RM3 for recording (I), stop (II), play-back (III) and repetition (IV) are carried out in a manner to be described in detail hereinbelow with the aid of a single switch button 118 (knurled button) and a set of contact springs F, consisting of nine contact springs $a$ to $i$. In adition to the microphone $Mi$ and the operating switch 117, the hand microphone 8 also contains a key switch $c$ for operating a correction marking by exciting the correction index magnet RM8, and a key switch L for marking the end of the letter in the index strip of the dictation machine by exciting the end of letter index magnet RM7 (FIGURE 7). The hand microphone also contains a damping resistance W$i$ and an indicator lamp AL, which lights up with a red light as soon as the dictating machine occupied has switched over to recording.

Before one of the dictating machines 2 to 5 provided in the exchange can be operated by the hand microphone 8 of a subscriber, the occupation of this dictation machine must first be effected, that is to say line connections must be made between the output of the hand microphone 8 (FIGURE 11) and the appertaining index unit 16, 17, 18, 19 (FIGURES 1 and 10). For this purpose the table stations 6 (FIGURE 12) are provided at the subscribers' positions and the control sets 10 to 13 (FIGURE 13) are provided in the exchange. The hand microphone 8 (FIGURE 11) is connected to the appertaining table station 6 (FIGURE 12) through the eight-core cable 7: L$a$, K$a$, K$b$, NN, P, W, S$a$, S$b$. The connections of the cores on the hand microphone 8 and table station 6 are similarly identified by the core designations.

The microphone or speech cores S$a$ and S$b$ lead from the microphone M$i$ (FIGURE 11) to the primary winding of a transformer U$_2$ of the table station 6 (FIGURE 12), of which the secondary side can at choice be connected to two of the speech cores S$a$, S$b$, lying in the main line 9, of the various dictation machines. The table station illustrated in FIGURE 11 is constructed for an installation with three dictation machines, but, as should be immediately visible, can be extended for any desired number of dictation machines merely by increasing the number of output cores. The speech cores S$a_1$ and S$b_1$ for example lead through the main cable 9 to the speech core connections S$a$ and S$b$ of the control set 10 (FIGURE 13) of the exchange, this set being allocated to the first dictation machine 2 with the index attachment 16.

In the control set (FIGURE 13) the speech cores S$a$ and S$b$ lead in turn through a transformer U$_1$ and the secondary side of the latter through speech cores S$a$, S$b$ to the appertaining dictation machine (FIGURE 9) where they are connected in the manner described above through the A–W switch 9S1 (FIGURE 9a) either to the input or the output of the amplifier 116 in the dictation machine. In each case the core connections are indicated by the reference numerals of the switch unit to which the respective core leads. If the connections are different for switch units occuring a plurality of times, the reference numeral of the switch unit connected is indicated for the respective reference numeral of the switch unit.

In the described speech core connections between microphones M$_1$ of the subscribers and the different dictation machines, in addition to the transformers U$_1$ and U$_2$, there are also provided various switch elements which serve to establish or to eliminate the line connection in a manner suitable for the purpose. These elements will be best understood as regards their arrangement and action from a general description of the mode of operation.

The mode of operation of the illustrated line selector dictation system is as follows:

The illustrated positions of the contacts correspond to the positions of rest, that is to say those positions in which the appertaining relays have no current, and in the case of the fork change-over switch GU (FIGURE 13) the position with the hand microphone lifted off.

When a subscriber wishes to record a dictation, he first lifts his hand microphone 8 (FIGURE 11) from the fork change-over switch GU of the table station (FIGURE 12). The contacts GUI$^1$, GUI$^2$ and GUII$^1$ of the fork change-over switch then switch on the voltage cores ($+24$ v., $-24$ v., and E) in the subscriber's table station 6. It is assumed that the dictation machines 3, 4 in the exchange are already occupied. Of the busy lines B1, B2, B3, . . . the busy voltage of $-24$ v. is fed to the busy lines B$_2$ and B$_3$ from the table stations which have occupied the dictation machines 3 and 4, and the busy line B$_1$ for the dictation machine 2 is still free of voltage. The busy voltage is fed from the other table stations, namely those which have previously occupied the dictation machines 3 and 4, through contacts $t$II$^4$ and $m2^7$ or $m3^7$ of the respective table stations 6. Of the busy lamps L1, L2, L3 connected to the busy lines, only the lamp L1 remains unlit, while the lamps L2 and L3 light up and thus indicate that the machines 3 and 4 are already occupied.

Should the occupied signal of the lamps L2 and L3 be overlooked, or if one of the lamps should have failed, then when one of the magnet busy keys M2, M3 with the key contacts $m2^1$ or $m3^1$ of one of the already occupied machines 3, 4 is depressed, the circuit of a buzzer S$u$ is closed through a contact $t$II$^1$ of a relay T which does not respond in this case, and which hereinafter is referred to as the T-relay, and hence the buzzing signal is given. As will be seen from FIGURE 13, the release voltage of $-24$ volts serving as free criterion passes through contacts $b$I$^2$, $a$I$^1$, $v$II$^1$, or $n$I$^1$, the middle tapping of the transformer U1, the speech cores S$a$, S$b$, the cable 9, the middle tapping of the transformer U2 (FIGURE 12), contact $t$I$^1$, rectifier G$r$8, breaker contacts $m1^u$, $m2^u$, $m3^u$, to the T-relay, the other pole of which is connected to earth through a rectifier and the fork change-over contact GUII$^1$. The T-relay will not respond when a speech line already occupied is selected, because owing to breaking of the contact $b$I$^2$, the release voltage of $-24$ volts necessary for the response of the T-relay can no longer pass to the speech cores S$a$, S$b$. If however the correct magnet key M1/$m1^1$ of the dictation machine 2 indicated by an illuminated lamp L1 as unoccupied is now pressed, the release voltage of $-24$ v., passes to the table station 6 (FIGURE 12) from the control set 10 (FIGURE 13) of the dictation machine 2 through the speech cores S$a$1 and S$b$1, and is passed through speech core contacts $m1^2$ and $m1^3$ via cable 9 through a middle tapping of the transformer U2, the T-relay contact $tI^1$, the rectifier Gr8, and the breaker chain $m1^u$, $m2^u$, $m3^u$, to the T-relay. The T-relay attracts and holds itself and the key $m1^1$ with its magnet M1 through its own sequence change-over contact $tI^1$ still connected to the voltage of −24 v., which however is now no longer supplied from the control set 18 through the middle tapping of the transformer U2, but from the −24 v. voltage core of the table station itself through the fork change-over contact $GUI^1$. With the response of the T-relay, the common earth line of the busy lamps is interrupted by the contact $tII^2$, so that the lamps L1, L2 L3 are extinguished, unless they have already been extinguished by other occupations of the respective machines. The breaker contacts $m1^u$, $m2^u$, and $m3^u$ (FIGURE 13) open for a short time on depression of the magnet key appertaining to them, whereby the effect is achieved that any previously depressed magnet keys drop back into their position of rest. Through T-contact $tI^4$, which when the T-relay is devoid of current, closes the primary side of the transformer U2, the connection is made to the microphone M1 through the speech core line $Sa$. The closing of the primary side effected by the contact $tI^4$ when the T-relay is devoid of current is intended to prevent the connection to the microphone M1 being made when the key is incorrectly depressed, for example the key M2 with contact $m2^1$ and closing of the appertaining contacts $m2^2$ and $m2^3$, and to prevent interferences reaching the speech core lines of other users.

On the response of the T-relay, the occupation of the dictation machine 2 is effected, the circuit of a B-relay lying in the busy line B1 in the control set 10 (FIGURE 13) being closed through a relay contact $tII^4$ through the already closed contact $m1^7$, and connected to the voltage of −24 v. in the table station 6. On the attraction of the B-relay in the control set 10 of the dictation machine 2, the speech cores $Sa1$ and $Sb1$ are relieved of voltage by a B-relay contact $bI^2$. As already stated, the release voltage is thereby disconnected and double occupation by other subscribers is thereby prevented. The voltage of −24 v. applied to the busy line B1 serves at the same time for other subscribers as a criterion of the occupation, since the busy lamp L1 allocated to the dictation machine 2 is then lighted in all the other table stations when the microphone is lifted off from the fork switch. While therefore the busy relay voltage and busy lamp voltage of −24 v. is transmitted to the busy lines B1, B2, B3 . . . with the busy relay B from the occupying table stations, the speech core voltage of −24 v. serving as the free criterion is transmitted from the control set of the respective dictation machine to the speech cores $Sa1$, $Sa2$, . . . and $Sb1$, $Sb2$ . . . . In addition, through a contact $bI^2$ of the B-relay, the occupied lamp belonging to the control set in the operating lamp control field 54 of the exchange (FIGURE 3) is caused to light up. The circuit of this control lamp is closed by the −24 volt connection of the control set through the contact $bI^2$ and the connecting line BL leading to the control field 54. On the response of the T-relay (FIGURE 12), the position at the time in question of the sound head M2 or slide 73 in the occupied dictation machine is indicated on an instrument FA in the table station 6 (FIGURE 12). The circuit of this station runs from the −24 volt connection of the table station through the fork change-over contact $GUI^2$, the instrument FA, a T-contact $tI^2$, an M1-contact $m1^6$, a remote indication line $Fa1$, which runs from the table station to the index unit 16 (FIGURE 10) of the dictation machine 2, through the slide contact 111 and sliding resistance 110 to the earth connection KE.

As can be seen from the relay diagram of FIGURES 14 and 15 for control sets 10, 11, 12, 13 and dictation machines 2, 3, 4, 5 with index units 16, 17, 18, 19, in the control set only the relay V and relays N, NH, and III are excited before the occupation. It can easily be seen therefrom that all the contacts in the line starting from the −24 v. distribution point of any one of the control sets and giving the release voltage of −24 v. to the speech cores $Sa$, $Sb$ are closed. If then, as described above, the command (a) "occupation" is given to the busy line B1 by the depression of the magnet key $m1^1$ (M1) (FIGURE 12) and response of the T-relay in the table station, the B-relay (FIGURE 13) response, and the III-relay is thereby caused to drop. In the dictation machine 2 the start-stop relay RM1 and the A–W relay RM3 are attracted, so that the machine is in the stop position ready for recording. This adjustment of the start-stop relay RM1 and A–W relay RM3 is produced by the adjustment, visible in FIGURE 3, of the relay contacts in the command loop K of the control set, which is controlled by the relays B, N, V and I, II, III and IIH. As can be seen from the diagram in FIGURE 14 the relays V, N and III controlling the command loop K are attracted and the stop condition of the dictating machine is transmitted through the command loop KE, $nII^2$, $2hI^2$, $1I^2$ and the connection line $Rm1$ (FIGURE 13) leading to the start-stop relay RM1 in the dictation machine (FIGURE 9). After the response of the busy relay B, the relay contact $nII^2$ is bridged over by the B-contact $bII^2$ without influencing the stop condition.

On the response of the B-relay moreover a condenser C2 connected in parallel to the III-relay (FIGURE 13) is discharged by the B-contact $bI^1$ through a resistance R2 and the command core $Ka$, so that after a period of time corresponding to the time constant of the discharge circuit the III-relay drops. In the command loop K, the III-contact $3II^2$ is thereby pulled and connected in parallel to the IIH-contact $2hI^2$, without thereby influencing the stop condition of the dictating machine.

After the response of the release relay T in the table station 6 (FIGURE 12) and of the busy relay B in the control set 10 (FIGURE 13), the occupied dictation machine 2 can be operated in the desired manner by the subscriber after operating the microphone single-button switch 117, 118.

If the said switch is brought into the "recording" position, the spring contacts $d$ and $e$ are separated from one another by a cam 118a of the switch lever 118 (FIGURE 11), through a contact spring snout $d1$, and the spring contacts $b$ and $c$ are first connected together and thereafter the spring contacts $a$, $b$ and $c$ are connected together. In this recording position, +24 v. pass from the +24 v. voltage core connection of the table station 6 (FIGURE 12) through the fork change-over contact $GUI^1$, the connection line P, the rest contact of the L-key for the letter end index and the left-hand spring contact $c$ of the spring contacts $a$, $b$, $c$ to the command core $Ka$ and thence via the contacts WT2, $tI^3$, and $m1^4$ which are then closed in the table station (FIGURE 12) to the control core $Ka1$ and to the connection point $Ka$ in the control set (FIGURE 13), and are there applied to a relay I through a rectifier and the contact $2hII^1$, which is then connected, of the non-energised IIH-relay (see relay diagram FIGURE 14). The relay I through its contact $1I^2$ (FIGURE 13 right-hand side) breaks the command earth loop KE, $bII^2$, $2hI^2$, $1I^2$ to the control core $Rm1$ of the start-stop magnet RM1 (FIGURE 9) in the occupied dictation machine 2. The circuit of the RM1-relay is thereby broken (see FIGURES 5 and 6) and the connection made between the motor 66 and the driving roller 62 for the belt 59, by the dropping-in of the friction roller 68. As the recording-play-back relay RM3 remains attracted, the dictation machine runs and records. The current loop of the A–W relay RM3 (FIGURE 13) is formed by the connection KE, $bII^2$, $2II^1$ (FIGURE 13), and the connection line RM3 to the RM3 relay and +24 volt voltage from the rectifier G12 (FIGURE 9).

The correct response of the apparatus to the recording command of the microphone switch 117 (FIGURE 11) is indicated by the lighting up of the recording lamp AL in the hand microphone. The lamp circuit, and also the command line K$a$1, are closed from the fork change-over contact GUI$^1$, namely by +24 v. in the table station 6 through GUI$^1$, line P, the spring contact $c$ of the switch 117, and the spring contacts $a$ and $b$ of switch 117 connected one after the other to the said contact $c$ the lamp core L$a$ and the T-contact $t$II$^2$ in the table station, and also the fork change-over contact GUII$^1$ and earth (right-hand side FIGURE 12).

For the purpose of reducing the room noise level, a damping resistance W$i$ is connected in parallel to the microphone M$i$, and during intercommunication speech with the supervisor can be disconnected by pressing the WT key in the table station (FIGURE 12). The current path then runs from earth in FIGURE 12 through WT3, the connecting line W in FIGURE 11, the resistance W$i$, and the contact springs $h$, $i$ to the microphone M$i$.

If it is desired to repeat the recorded text, the microphone switch 117, as shown in FIGURE 11, must be moved from the recording position I through the stop position II and the play-back position III to the repetition position IV. This operation is illustrated in the relay diagram FIGURE 14 for the control set and the dictation machine. The transition to the stop position represents the simple reversing of the operation described above. For this purpose the I-relay in the control set drops again, point ($c$) (FIGURE 14), and the start-stop relay RM1 in the diceation machine attracts again. When the switch is moved out of the stop position II into the play-back position III, the II-relay first responds in the control set (FIGURE 13), point ($d$) FIGURE 14). In the play-back position of the knurled button 118 (FIGURE 11) on the hand microphone, the two spring contacts $f$, $g$ are first connected together and the contacts $h$ and $i$ are then opened. The voltage of +24 v. applied to the hand microphone through the connection line P by the table station thus passes to the control conductor K$b$ and through the contacts WT1, $t$II$^3$ and $m$1$^5$ to a control conductor K$b$1 of the dictation machine 2 (FIGURE 13). In the control set (FIGURE 13) the relay II–H is thereby energised by the connection K$b$ of the command conductor through a contact 2I$^1$. The II H-relay responds with retardation on the closing of the II-relay contact 2I$^1$, because a condenser C10 connected in parallel to it must first be charged, this condenser being switched off by the contact 2$b$II$^2$ after the response of the II–H relay and recharged through a resistance R10. Through the sequence switching of the relays II and II–H on switching on and off the effect is achieved that the A–W-relay RM3 in the dictation machine (FIGURE 9) is operated before the dropping and after the attraction of the start-stop magnet RM1, in order to avoid recording of the change-over noise of the A–W-relay RM3. On the response of the II-relay (FIGURE 13), the command loop of KE is first interrupted by the appertaining relay contact 2II$^1$ by way of $b$II$^2$ and 2II$^1$ to the connection line R$m$3 of the RM3-relay, and the said relay is thereby caused to drop, that is to say changed over to play-back. During this operation however the running of the belt 59 is not stopped. Only after the II-relay has responded and through its contact 2I$^1$ the sequence relay II–H has likewise been connected to the command line K$b$, is the circuit of the RM1-relay interrupted and the dictation machine thereby switched over to "start" by the opening of the contact 2$h$I$^2$ in the command loop K. In consequence of the contacts $h$, $i$ opened in the hand microphone in FIGURE 11, the damping resistance is switched off from the microphone M$i$, which now acts as loudspeaker.

Since, as has been assumed above, it was desired to switch over from recording to repetition, the microphone switch 117 is now moved beyond the stop and play-back position to the repetition position IV. The spring contacts $b$ and $c$ are connected together by a cam 118$b$ of the switch button 118 through the spring snout $d$1 or a return spring $j$, and through the spring set, $b$, $c$ +24 v. are additionally applied to the command line K1, while in the control set the relay I attracts with a delay through its own contact 1I$^1$ point ($e$) (FIGURE 14), since the capacitor C1 has been connected in parallel to this relay through the II–H-relay which has been energized in the meantime, and through the contact 2$h$II$^1$ of the latter. Through the contact 2$h$I$^1$, the II-relay is connected to a +24 volt connection of the control set and thus holds itself. Since in this position the relay II and II–H likewise remain continuously attracted (play-back position), the relay I acts as a self-energised flip-flop. The capacitor C1 is charged through contacts 2$h$II$^1$ and 1I$^1$. The relay I attracts only after the charging time. When the relay attracts, the contact 1I$^1$ opens, and the relay I drops after the discharge of the capacitor C1. 1I$^1$ thus closes again and the operation is repeated as long as contact 2$h$II$^1$ remains closed. Through the command loop K to the dictation machine and by way of the line KE the contacts $b$II$^2$, 2II$^1$, 1II$^2$ and the connection lines R$m$2 the repetition magnet RM2 in the dictation machine is caused t o respond in the form of an impulse, since the contact 1I$^2$ of the I-relay is open and closed in rhythm with the flip-flop. The connection line R$m$2 is looped from the control set, FIGURE 13, through the index attachment, FIGURE 10, and its cable switch S8, so that only repetition is possible when the said cable switch S8 is closed.

As long as the switch 117 is held by the subscriber in the repetition position, the listening head M2 in the dictation machine 2 is moved back step by step by the flip-flop operation of the repetition magnet RM2 (FIGURE 9). When the desired position of the dictation has been reached, the switch is returned to the starting position under the action of the restoring spring $j$ on the releasing of the knurled button 118, whereupon the following text of the dictation is reproduced, point ($f$), FIGURE 14.

When passing over from the play-back position II to the stop position, the II–H-relay first drops, point ($g$), FIGURE 14, and through the closing of its contacts 2$h$I$^2$ causes the start-stop magnet RM1 to attract whereby the running of the belt 59 is stopped. Only directly thereafter does the II-relay also drop and through interruption of the connection line R$m$3 to the A–W-relay RM3 changeover to the recording by its contact 2I$^1$.

In the stop position other functions can now be brought about by the subscriber.

Thus, during the occupation of a dictation machine, each subscriber is able through the same portion of the line to give instructions through the intercommunication channel to the supervising person in the exchange. For this purpose the subscriber presses the WT key with its contacts WT1, WT2 at the table station (FIGURE 12). The contact WT2 of this key switch then interrupts the command conductor K$a$ and during the duration of the intercommunication the contact WT3 switches off the damping resistance W$i$ in the hand microphone 8 (FIGURE 11). Through the contact WT1 a voltage of −24 v. is fed from the −24 v. voltage connection of the table station through the contacts GUI$^2$, WT1, $t$II$^3$ and $m$1$^5$ to the command conductor of K$b$1, and in the control set (FIGURE 13) a W-relay is connected through K$b$ to the −24 v. voltage.

The other side of the exciter coil of this W-relay is connected through WI$^2$ to a line WV which in the amplifier 37 (FIGURE 20) is guided through input WV, rectifier G$r$7, the line WB, and returns again as the WB line to the control set (FIGURE 13). The path of the current here passes through line WB, contact $w$II$^2$, line WE to earth. The W relay can thus attract, point ($b$), FIGURE 14, and connects itself by $w$II$^2$ direct to WE, while at the same time the WB–WV loop is broken. The contacts $wI^1$ and $wII^1$ (FIGURE 13) disconnect the speech conductors $Sa$, $Sb$ of the dictation machine, and connect them to the output points WS and WT of the control set. From here the connection WS, WT leads to the amplifier 37 (FIGURE 20) to the points WS and WT, from where it is taken via the path WS, $u2I^1$ or WT, $u2II^1$ to the amplifier input. For the purpose of fritting the contacts $wI^1$ and $wII^1$, each of these is inserted into a current path from the +24 volt connection to earth, the contact $wI^2$ being so inserted into a current path from the +24 volt connection through resistances R3, R5, contact $wI^1$, a resistance R6, and connection point $Sb$ to earth, and the contact $wII^1$ into a current path from the +24 volt connection through resistances R3, R4, the contact $wII^1$, and the connection point $Sb$ to earth. If through the switching-over of the W relay in the control set (FIGURE 13) the earth loop WE, $wII^2$, WB is broken, then in the amplifier 37 (FIGURE 20) a WT relay is deprived of current, of which the —24 volt circuit via relay WT, the WB line, the contact $wII^2$, and the connection WE to earth was closed.

Through the dropping of the WT relay in the amplifier 37, the output is conected through contact $u1I^1$, $wtI^1$/WS, or $u1II^1$, $wtII^2$, and the relay WT to the loudspeaking microphone $Ma$ of the supervisory station 33 (FIGURE 19). The reversal of the direction of the speech is effected through the supervisor by the depression of a button WT, whereby in the supervisory station a line WU is connected to the +24 volt voltage from the +24 volt connection through WT. In the amplifier 37 a U1-relay attracts through WU, $u2I^2$, and in consequence a U2-relay. The contacts $u1I^1$, $U1II^1$, $u2I^1$, and $u2II^1$ are thereby changed over and the amplifier input and output are interchanged, so that the supervisory station 33 is connected to the amplifier input and the subscriber to the amplifier output. If a plurality of dictation units are connected to the alternating speech traffic, the WE–WB-outputs of the individual control sets (FIGURE 13) are connected in a chain arrangement in such a manner that WE of the first control set is connected to earth, WB of the first control set is connected to WE of the second, WB of the second to WE of the third, and so on, and finally WB of the last control set to WB of the amplifier 37 (FIGURE 22).

The WV connections of the individual control sets (FIGURE 13) are all connected to the WV connection of the amplifier 37 (FIGURE 20). In this way double occupation of the alternating speech path is prevented. On the establishment of the alternating speech connection, an alternating speech lamp WL lights up in the table station, the lamp circuit being connected from the —24 volt connection of the table station through the contact $GUI^2$, the lamp W1, the conductor WL to the control set 10 (FIGURE 13), the relay W, the contact $wII^2$, and the connection point WE to earth. Through release of the WT key, the alternating speech connection is interrupted again, point ($i$), FIGURE 14.

The device can also be used by connecting a telephone adaptor $Ad$ with the aid of a key with three contacts T1, T2, and T3 in the table station 6 (FIGURE 12) for the recording of telephone conversations. Through the keys T1 and T2, the microphone $Mi$ is disconnected from the speech conductors $Sa$, $Sb$, and the adaptor $Ad$ is connected after it has been connected to plug contacts $t1$, $t2$ of the table station. The control of the recording is effected by the microphone switch 117 as in normal dictation. Through the key contact T3 a pilot lamp TL for telephone recording is made to light up, its circuit being closed from the —24 volt connection of the table station through the contact $GUI^2$, the lamp TL, and the contact T3 to earth.

In the stop position, markings can also be made on the index strip on the dictation machine to show correction points (index C) or for marking the end of the letter (index L). The manner in which these operations take place is shown in the relay diagram (FIGURE 14 bottom) points ($k$) and ($l$). The effecting of the correction marking takes place through the operation of the C-key on the hand microphone (FIGURE 11). On the depression of the C-key, —24 v. pass out of the table station through $GUI^2$, the connection line NN, the spring contact set $d$, $e$ and the bottom contact C1 of the C-key to the command line $Ka$, thence via the contacts WT2, $tI^3$ and $mI^4$ to the command conductor $Ka1$ and in addition +24 v. by way of the fork switch-over contact $GUI^1$, the connection line P, the reset contact $l1$ of the L-key, and the top contact C2 of the C-key to the command line $Kb$, and thence via the contacts WT1, $tII^3$, and $mI^5$ to the command conductor $Kb$ of the control set 10 for the dictation machine 2. In the control set 10, the relay II with the subsidiary relay IIH and the relay III accordingly respond, point ($k$), FIGURE 14. By way of the command loop KE, $bII^2$, $3I^1$, $2II^1$ and the connection line $Rm8$ the index coil RM8 is thus connected to the discharge circuit of a capacitor $50uF$, which is connected by one pole to the earth connection KE and by the other pole to the magnet RM8. This capacitor is continuously charged by a 250 volt connection through a resistance 25K. On discharge of the capacitor through the index coil RM8, the index marking for corrections is made in the index strip.

As can be seen from the relay diagram in FIGURE 14, on the excitation of the II–H relay in the course of the index marking for correction, through the dropping of the appertaining relay contact $2hI^2$ the circuit of the RM I-relay is temporarily interrupted and after the delayed response time of the III-relay is switched on again by the closing of the appertaining relay contact $3II^2$. In addition, on the switching-on of the II-relay, the A–W relay is likewise temporarily deprived of current through the contact $2II^1$ of the former, and on the dropping of the II-relay is switched on again through the reclosing of the contact $2II^1$. This temporary switching on and off of the RM2-relay and of the RM3-relay represents only an unimportant accompanying phenomenon, which is connected with the mode of construction of the command loop K.

The end-of-letter index is operated by operating the L-key in the hand microphone 8 (FIGURE 11). By depression of the L-key, all supply of current to the command line $Kb$ is suppressed, while —24 v. are supplied to the command line $Ka$ through the top contact 12 of the L-key. In the control set only the relay III is consequently energised through the command line $Ka$, the contact $bI^1$, and the resistance R2. This relay responds with delay through the capacitor $C_2$ connected in parallel, and through its contact $3I^1$ in the command loop K and the contact $bII^2$ switches on the connection line $Rm7$ to the index magnet RM7 with delay.

On replacement of the hand microphone 8 on the fork change-over switch of the table station 6, the occupation of the dictating machine 2 is terminated. By the opening of the fork change-over contact $GUI^2$, the busy line B1 is interrupted, in order that the busy relay B may be caused to drop, point ($m$), FIGURE 15, and, as the N-relay because of the open III-relay contact $3II^1$ is without current and its contact $nII^2$ is open, the dictation machine may be started from the stop position and switched over to play-back by interruption of the command loops both to the RM1-relay and to the RM3-relay. In this way, the re-setting of the machine is brought about, irrespective of whether the machine is in a middle repetition position or at the end of the letter on the termination of the occupancy.

If for example after the recording of a dictation the beginning of the recording is listened to again by repetition, and the connection to the control set is broken by replacing the microphone on the fork change-over switch before the end of the letter is reached, the dictation unit is not immediately released for a new occupancy, but remains capable of occupation until the sound head slide 73, or the index slide 101 operatively connected to it, has run to the pull-slide 106, and the resetting switch S7 has closed again.

By the closing of the starting contact S7, the circuit is then closed from the earth connection KE of the dictating machine through the starting contact S7, the connection line Na to the control set 10, the contacts bII¹, th1, and a NH-relay to the −24 volt voltage connection of the control set of −24 v., and at the same time the circuit is also closed through the parallel branch to the NH-relay through a rectifier, a relay Th1, and a contact 3I², so that at the same time the NH-relay and the Th1-relay respond (point (n) relay diagram, FIGURE 15). A hot wire spring set in the Th1-relay heats up. Its regulable response time determines the length for the constrained re-setting, which in the case of regulation amounts to 8–10 seconds. The Th1-relay accordingly responds, switches off itself and the NH-relay with the th1-contact. Through connection in parallel of a capacitor 2C1 charged by the −24 volt connection through a resistance R2m, a contact nhI¹, and earth, the dropping of the NH relay is delayed. Through the changing-over of the th1 contact, the N-relay is connected through nhI², namely through the current path −24 v., N-relay, contacts nhI², th1, bIII, Na connection to the index addition FIGURE 10, switch S7, earth KE. The N relay connects the III-relay to voltage through nI² by way of −24 v., nI², bI¹, R2, and the said III relay then closes a contact 3II¹ and thus connects the N-relay through connection point Na to the index attachment FIGURE 10, the switch S7, and connection point KE, to earth. The automatic letter end marking is thereby released through the command loop: KE, nII², 3I¹, 2II², Rm7, and the connection line to the letter end index magnet RM7, point (p) FIGURE 15. The other pole of the RM7-magnet is connected to the capacitor 50uF, which is charged by the 250 v. connection through the resistance 25K after the earth connection KE and discharges through the magnet and the designated path of the command loop in the control set. The III relay cannot be connected to the −24 volt connection through the contact bI¹ and nI², since the N relay has dropped through the opening of the B relay contact bII¹. On the other hand, through the B contact bII¹ the circuit −24 v., NH relay is made to respond immediately through the B relay contact bII¹. The Th1 relay connected in parallel to the NH relay is likewise also closed through the III relay contact 3I². The thermo-contact of the relay Rh1 is slowly heated up and after the heating-up period has passed switches over. After the switching over of the contact th1 the NH relays drops with delay, and the N relay is energised through the contact nhI² as long as the NH relay still holds, point (o), FIGURE 15, since its circuit from the −24 v. connection is closed through the relay N, the contacts nhI², th1, bII¹, the connection conductor Na, and the re-setting switch S7 in the index attachment to earth. The N relay through its contact nI² energises the III relay with delay, and holds itself through the contact 3II¹. The contact nI¹ again gives the release voltage to the middle of the transformer U1.

Through the described dropping of the NH-relay and the response of the N-relay and of the III-relay, moreover the constrained re-setting is completed, the command loop for the RM1-relay being closed through the contacts 3II² and 1I² and the command loop for the RM3-relay closed through the contacts nII² and 2II¹.

The dropping time of the NH-relay outlasts the switch operation of the switching-on of the N-relay and of the III-relay through the hot wire spring set Th1 with its contact th1. When the III-relay has responded, the hot wire spring set of the Th1-relay is relieved of voltage with the contact 3I².

The hot wire spring set Th2 is provided for the purpose of avoiding disturbances through occupations and releases occurring shortly one after the other. If Th1 should not yet have dropped, Th2 takes over through its holding contact th² the above described switch operation of the constrained re-setting. All supply of current is at the same time interrupted to the middle tapping of the transformer U1 as a precaution, and a new occupation is thereby prevented until the re-setting of the machine has taken place. On repetition, the sound head slide 73 and the index slide 101 coupled fast to it must run back away from the pull-slide 106. For this purpose the energisation of the driver magnet RM6 must be disconnected. This is effected through the attraction of relay I and relay II by their contact 1II¹ and 2I², which in the current-less condition of the relays I and II close the circuit of the driver magnet RM6 separated from earth in the control set, through the connection line Rm6 to the index attachment, the driver magnet RM6, and a −24 v. voltage connection. The excitation of the relays I and II on repetition has already been described above more fully in the description of the operations of the repetition. By the opening of contacts 1II¹ and 2I² in the repetition position, the circuit of the driver magnet RM6 is thus interrupted. At the same time the pull-slide 106 must be held fast in the end-of-letter position reached before commencement of the repetition. This is effected through energisation of the holding magnet RM5. This energisation is effected through the dropping of the relay N with its contact nI² in the repetition position of the microphone switch. The circuit of the N relay is broken by the moving away from one another of the slide 101 and the slide 106, since then the switch S7 situated in the circuit through the connection line Na is opened. Through the dropping of the Th1 relay and response of the NH relay, readiness for a new occupation has again been established, point (p), FIGURE 15.

A short description will now be given of the operations which take place on occupation and termination of the occupation after dictation, without the repetition being effected. The operations for occupation point (r) FIGURE 15, recording point (s) FIGURE 15, and stopping, point (t) FIGURE 15, are the same as already described above and also shown in the relay diagram. If after the stop the switch is not made to repetition as described above, but the occupation is merely terminated by replacing the hand microphone on the fork change-over switch of the table station, the following effects occur. On the interruption of the busy line B1 through the fork change-over contact GUI², the B-relay drops point (u) FIGURE 15. Through its contact bII¹ the circuit of the N-relay is broken from −24 v. through N, bII¹, Na, S7 in FIGURE 10 and earth KE. By the opening of the nII²-contact the command loops of both the RM1-relay and of the RM3-relay are broken, so that the dictating machine runs on in the recording position. The connection point Na in the control set (FIGURE 13) is connected to earth, since the switch S7 (FIGURE 10) is closed. Since there has been no repetition in this case, there is no automatic re-setting to the end-of-letter position. Only the constrained running-on of the sound head slide together with the pull-slide beyond the end-of-letter position occurs. The operations previously described for the constrained re-setting on completion of the automatic resetting are here repeated, points (v) and (w), FIGURE 15.

On completion of the constrained running-on, the brake lifting magnet RM4 for the cable brake 97 in the index attachment, which is connected by one pole to the earth connection, receives the −24 v. necessary for the response from the −24 v. connection of the control set by way of its connection Rm4 to the control set (FIGURE 13) and through the contacts hII¹ and bI². The brake shoe is released and the cable line runs to the repetition breaker point S8 (cable contact) in consequence of spring tension with the locking stop. On renewed occupation of the dictating machine the stop prevents repeating-back (breaking of the repetition breaker contact after the first step) of the preceding recording.

On the running of the sound head slide 73 in the dictating machine on to the band end contact S2 (FIGURES 6 and 9), the holding current for the V-relay of the control set (FIGURE 13) is broken, which otherwise flows from the mains rectifier G12 of the dictation machine through the switches S3, S2, and the connecting line V$a$ of the dictation machine (FIGURE 9) to the control set, and through the V-relay to the earth connection E. The V-relay drops. Through the current path of the command loop KE, $v$I$^2$ and connection point R$m$1, the stop-start magnet in the dictation machine is made to respond, the machine stops. In the relay diagram FIGURES 14 and 15 this operation is not shown. At the same time the supervisory station 33 (FIGURE 19) receives through the V-contact $v$II$^2$ and the connecting line AL an acoustic signal through the buzer S$a$, the circuit of which is closed from the +24 v. connection of the supervisory station through the buzzer S$a$, the connection line AL1, AL2 to the control set of the respective dictation machine and the $v$II$^2$ contact to earth. In the recording position of the control set, the contacts $v$II$^1$, 1II$^1$, and $n$I$^1$ connects the middle tapping of the transformer U1 to earth and in the subscriber's table station 6 the buzzer S$u$ responds, the circuit of which is closed from the +24 v. connection of the table station through GUI$^1$, S$u$, $t$II$^1$, U2, S$a$, S$b$, U1, $n$I$^1$, VII$^1$ and 1II$^1$. If the subscriber goes over to the stop position, the I relay drops in the control set and its buzzer is silent through the interruption of the circuit on the dropping of the contact 1II$^1$.

While the V-relay is in the position of rest (the machine has run on to the band end contact), the A-relay is switched on with the contact $v$I$^1$ and, by its own contact $a$II$^1$, switches on a capacitor C3 for the retardation of the drop, its circuit being closed from the −24 v. connection in the centre set through $b$I$^2$, A, and $v$I$^1$ to earth.

When a new belt has been placed in the dictating machine, the sound head brought to position 0, and the locking lever 82 switched on with the switch S3, the V-relay attracts again and through the contacts $v$I$^1$, $a$I$^1$, $v$II$^1$, $n$I$^1$, U1, S$a$, S$b$, U2, $t$II$^1$, S$u$, GUI$^1$ a short earth pulse is given by the +24 v. connection of the table station 6. In the subscriber's table station the buzzer then briefly responds and thus indicates that the belt has been changed. If the operating voltage in the dictating machine should fail, the V-relay is likewise released and gives the alarm in the same manner as the alarm is given by the band end.

As FIGURES 16 and 17 show, the dictating machines 4 and 5 can work, as desired, for continuous dictation, double recording, or in an individual machine connection.

If continuous dictation is desired, the magnet key D1 is to be depressed in the supervisory station (FIGURE 19). The said key holds itself by the closing of the circuit from the +24 volt connection of the supervisory station through the contact $d$1, Z1, the coil D, and the keys D1, ET to earth. The voltage is taken by way of the contact $d$2 from a pilot lamp EL for individual apparatus operation and connected to a pilot lamp DL for continuous dictation, and also through a rectifier to the point ET$a$. In the individual apparatus switch-over (FIGURE 17) an E1 relay is caused to respond by way of the input ET$a$. With its contact $e$1I$^1$ it connects a BE line to earth and simultaneously therewith through a rectifier G$r$17 relays E2, E3, E4 of the unit 14 (FIGURE 17). The dictation machine No. 5 and its index addition 19 is thereby connected from its appertaining control set 13 to the conference changeover and double recording unit 15 (FIGURE 16), which in turn is connected to the control set 12 of the dictation machine 4 with index attachment 18. This dictation machine is provided for conference purposes with a special band end contact S4, which is closed when the end of the band is reached and lies in a circuit line from the BE connection of the individual apparatus change-over unit 14, FIGURE 17, through the loop BE–S4–BE in the dictation machine 4 (FIGURE 9) to the BE connection of the conference change-over and double recording unit 15, FIGURE 16. If the sound head slide 73 of the dictation machine 4 now runs on to its band end contact S4, the earth connected to connection BE through contact $e$1I$^1$ in the individual apparatus change-over (FIGURE 17) is looped through BE–S4–BE and offered in the conference change-over and double recording unit 15 (FIGURE 16) through connection BE and a rectifier to the relay AA, the other pole of which is connected through the line $x$ to the +24 v. connection of the unit 15. Through the closing of the contact $d$3, the supervisory station 33 (FIGURE 19) had previously offered earth through the connection point DD and the corresponding conductor in the conference change-over and double recording unit 15 (FIGURE 16). If the relay AA (FIGURE 16) now pulls, it connects earth, through $aa$I$^2$, from the connection point DD by way of a line $z$ to a relay D1, which is connected through the line $x$ to the +24 v. connection of the unit 15. This relay D1 through contact $d$1II$^2$ energises the relays D2 and D3. The AA–relay is held fast in its working position through the changed-over contact $d$1I$^1$, its circuit being closed from the +24 v. connection of the unit 15 through the line $x$, coil AA, contacts $d$1I$^1$, $aa$I$^2$, line $z$, DD, and contact $d$3 in the supervisory station 33. Through this operation all $d$- and $aa$-contacts are changed over in FIGURE 16.

The commands coming from the command loop K of the main control set 12 operate through the connections and connecting lines R$m$2, R$m$3, and R$m$1 two relays C1 and C2, which are connected by their other pole to the +24 v. connection of the unit 15. After the apparatus earth KE of the dictation machine No. 5 has been switched through, by the changing-over of the contact $d$2II$^2$, through the earth line KE from the dictation machine 5 (FIGURE 9) to the unit 14 (FIGURE 17), the contact $e$4I$^1$, the earth line KE from the unit 14 (FIGURE 17) to the unit 15 (FIGURE 16), the contact $d$2II$^2$, and the earth line KE from the unit 15 (FIGURE 16) to the main control set 12 (FIGURE 13), the commands of the relays C1 and C2 can be transmitted through the secondary comand loop K5, controlled by the relays C1 and C2, by way of the connections KE and the contact $aa$II$^1$ of the said loop, by way of the contacts $c$1II$^1$, $c$2I$^2$ of the loop K5, and the connecting conductors R$m$1, R$m$3, and R$m$2 to the individual apparatus change-over apparatus 14 (FIGURE 17) and through its contacts $e$3I$^2$, $e$3II$^1$, $e$3II$^2$, and $e$4I$^1$, and connections R$m$1, R$m$3, R$m$2 and KE to the exchange dictation machine No. 5.

The speech voltage arriving in the unit 15 (FIGURE 16) from the main control set 12 through the speech conductors S$a$, S$b$ passes by way of the continuous S$b$ conductor or from the S$a$ connection by way of a contact $d$1I$^2$, a capacitor C$_2$, and coils L1, L2 and the speech conductors S$a$, S$b$ of the unit 15 (FIGURE 16) to the unit 14 (FIGURE 17) through contacts $e$2II$^2$ and $e$3I$^1$ and speech conductors S$a$, S$b$ of the unit 14 (FIGURE 17) to the dictation machine 5 (FIGURE 9). If the machine 5 now runs on to the band end contact S4 (machine 4 has in the meantime been equipped with a new belt and the sound head in the starting position, that is to say the switch S4 of the machine 4 is opened again), the switch S4 in machine 5 closes. The earth loop BE–S4–BE of this machine, which is connected to the connecting point BE of the unit 14 (FIGURE 17) and to a second connection point BE in FIGURE 17, is thereby closed. The D1 relay of the unit 14 (FIGURE 16) thereby receives earth short-circuit, namely from earth through the contact $e$1I$^1$ of unit 14 (FIGURE 17), through the loop BE, S4, BE in the dictation machine 5 (FIGURE 9), the bottom BE connection point of the unit 15 (FIGURE 16), coil D1, contact $aa$I$^2$, line $z$, connection conductor DD to the supervisory station 33 (FIGURE 19) and contact $d3$ to earth. The D1 relay thus drops. The relays D2, D3 then also drop via the contacts $d1I^1$ and $d1II^2$, and the AA relay drops with delay (contact $aaI^1$). The secondary command loop $K^4$ (FIGURE 16) then works with the contact arrangement $C1I^1$, $c2I^1$, $c1I^2$, whereby the dictation machine No. 4 is controlled. The speech conductors $Sa$, $Sb$ are likewise connected to the machine No. 4.

The disconnection of the continuous dictation device is effected with the ET key in the supervisory station 33. In order to avoid a gap in the recording during the change-over from one machine to the other, provision is made for a band change overlap as a consecutive switching of the contacts $aaII^2$ and $d1I^2$. When the dictation machine 4 switches over ($c2II^1$ is closed in the recording position). $aaII^2$ in the speech conductor $Sa$ and $aaII^1$ in the command loop $K5$ will first pull. Machine 5 starts to record in parallel with machine 4 until the latter is switched off and stopped by the pulling of $d1I^2$ and $d2II^2$ respectively.

For the purpose of making two belt originals, the two dictation machines, 4, 5 can be operated in parallel. For this purpose the supervisor in the supervisory station connects the magnet key Z with coil Z. The unit 14 (FIGURE 17) is hereby switched as for continuous dictation, the contact Z2 taking over the function of the contact $d2$ and the pilot lamp ZL indicating double recording operation. In addition, in the conference change-over and double recording unit 15 (FIGURE 16), earth potential is applied to the distributor point ZZ, namely from earth in the supervisory station 33 by way of a contact Z3, a conductor ZZ to the unit 15 (FIGURE 16), a line $y$ to the relay AA, which is connected through line $x$ to the +24 v. connection of the unit 15.

While the relays D1, D2, D3 remain in the position of rest, the AA-relay attracts. The contact $aaII^2$ connects the speech cores $Sa$, $Sb$ of the second dictating machine 5, which run through the unit 14 in parallel to that of the first dictating machine 4. The connection of the speech core $Sa$ of the second machine 5 runs through the contacts $C2II^1$ and $aaII^2$. The contact $aaII^1$ permits the simultaneous control of the second dictating machine 5. The filter L1, L2, C3 incorporated in the microphone line prevents the erasure frequencies of the two machines from affecting one another.

In the play-back position (relays C1, C2 have dropped) only the first machine is connected to the speech conductors. Repetition is again effected through both machines. All other functions, such as correction, index, resetting lock (N-relay), operation indication (V-relay), and brake magnet are controlled in dual recording operation only in conjunction with the first machine 4.

If the second dictating machine 5 in parallel operation is then to be operated separately from the first dictating machine 4, the so-called individual machine changeover device 14 (FIGURE 17) must be switched back between the control set of the second machine and the conference change-over and double recording unit. By operation of the key ET in the supervisory station, this operating condition is retained.

Individual machine operation is accordingly possible in the position of rest of all keys in the supervisory station. The conference control installation 40 used for recording conference speeches (FIGURES 18) can be connected to any desired subscriber table station 6 (FIGURE 12) in line selector dictation exchanges. Occupation of the exchange dictation units is again effected by the subscriber's table station with the magnet keys. Instead of the hand microphone 8 (FIGURE 11), the conference control apparatus 40 (FIGURE 18) connected takes over the control of the dictation machine in the exchange. Through a push-button unit T1 to T8, up to eight microphones MK are connected to the control amplifier 120 (two-stage transistor amplifier).

Through a hand switch with contacts $ss1$ and $ss2$, the machine 4 or 5 working alternately in the conference arrangement can be brought into the recording position or stop position. For this purpose a circuit is provided, which runs from the +24 v. connection of the table station 6 (FIGURE 12) through the fork change-over contact GUI1, a connection conductor P to the conference control apparatus 40, the switch contact $ss1$, a connection conductor $Ka$ to the table station (FIGURE 12), and the contacts WT2, $t1^2$, $m3^4$, the connection conductor $Ka3$ to the control set 12 (FIGURE 13) whereby the energisation of the relays I and III in the manner already described above the dictation machine 5 or 4 is switched to "recording" or "stop."

Through the second contact $ss2$ of the hand switch on the conference control apparatus 40 (FIGURE 18), the +24 v. voltage from the table station is applied to the transistor amplifier 120 as the operating voltage, by way of a pilot lamp ALK indicating the operating condition.

The output of the transistor amplifier 120 passes through a potentiometer 2K and connection conductors $t1$, $t2$ to the table station (FIGURE 12), so that when the keys T1, T2 in the table station are depressed, the connection to the speech conductors $Sa$, $Sb$ is established.

To the output of the transistor amplifier 120 there is also connected a monitoring headphone KK, in order to enable the output voltage to be adjusted to the required volume of sound with the aid of the potentiometer 2K.

With the conference control apparatus 40 only recording/stop control is possible (play-back and repetition are impossible).

The conductors required per dictation unit in the described dictation exchange arrangement amount to six in number. Three conductors for current supply and one conductor for intercommunication indication are common to all the dictation units.

We claim:

1. A dictation installation having at least one dictation machine disposed in an exchange and operated from a distance by separate dictation stations, apparatus comprising, said dictation stations, means including a locking collective line for each dictation machine coupling the latter to each of said stations, a source of busying energy, means at each dictation station for selectively transfering energy from said busying energy source over the said collective line for busying said dictation machine, and means for preventing the means at the others of said dictation stations from transfering energy from said busying energy source over said collective line after the occupation has been effected in response to selection of busying energy for transfer over said collective line initiated at one of said dictation stations, each locking collective line both coupling a dictation machine to a dictation station associated with that locking collective line and for carrying the busying signal energy from said source of busying energy.

2. An installation, as claimed in claim 1, and further comprising a busy switch dictation station in the collective line, and means for connecting said busy switch so that of a plurality of simultaneously occupied busy switches only one switch can effect the occupation.

3. An installation as claimed in claim 1, whereby the busy switches are inserted one behind the other in the collective line, so that a busy switch situated nearer the source of busying energy, when operated, renders inoperative the busy switches situated at a greater distance from the source of busying energy.

4. A dictating installation, as claimed in claim 1 and further comprising, means for receiving a manual command from the dictating subscriber at a dictating station and an automatic command either of which commands signify termination of the occupation of the dictation machine, a listening lock to prevent undesired repetition operative in response to one of the manual command of the dictating subscriber at a dictating station and the automatic command through the termination of the occupation of the dictation machine, the latter lock including a resetting means for returning the dictation machine to its starting position following both selection of repetition by the dictating subscriber and failure of the dictating machine to return to its starting position.

5. An installation as claimed in claim 4 wherein said listening lock has a stop with a cable line in which a spring is incorporated and further comprising rollers of different diameters, and means for connecting the ends of said spring to said rollers of different diameters so that the follow movement relieves the spring of stress and the return movement again stresses the spring.

6. An installation as claimed in claim 4 and further comprising, means for running said dictating machine a certain distance beyond the end of the dictation just recorded after termination of the occupation by a user at a dictation station.

7. A dictation installation comprising,
 a plurality of dictating machines each having a recording surface and a record-reproduce head for scanning said surface,
 a plurality of dictation stations each having at least transducing means for converting sound energy into electrical energy and dictation initiating means for effecting coupling between said transducing means and the record-reproduce head of one of said dictating machines,
 a source of a busying signal,
 a signal transmission line for each of said plurality of dictation stations,
 said dictation initiating means having means for selectively initiating transfer of said busying signal from said source to a selected one of said dictating machines only when said one dictating machine is then available for recording dictation,
 means associated with the selected one of said dictating machines responsive to said busy signal transmitted over a selected one of said signal transmission lines for coupling signals over said selected signal transmission line between the record-reproduce head of said one dictating machine and the transducing means at the dictation station associated with said selected signal transmission line then initiating the transfer of said busying signal to said one machine only when said one machine is then available for recording dictation while thereafter preventing said one machine from receiving said busying signal in response to initiation from any other of said dictation stations,
 the latter means being responsive to the initiating means at said then initiating dictation station providing an indication of completion of dictation for accepting a busying signal initiated from any of said dictation stations following such indication.

8. A dictation installation in accordance with claim 7 and further comprising,
 means for selectively coupling at least two of said dictating machines to the transducing means at one of said dictation stations during alternating contiguous time intervals to permit continuous recording for periods longer than the time duration required to fill one of said recording surfaces, and means responsive to fully recording on one of said recording surfaces on one of said at least two machines for decoupling the latter machine from said transducing means and coupling thereto another of said at least two machines with an unfilled one of said recording surfaces.

9. A dictation installation comprising,
 a plurality of dictating machines each having a recording surface and a record-reproduce head for scanning said surface,
 a plurality of dictation stations each having at least transducing means for converting sound energy into electrical energy and dictation initiating means for effecting coupling between said transducing means and the record-reproduce head of one of said dictating machines,
 a source of a busying signal,
 a signal transmission line,
 said dictation initiating means having means for selectively initiating transfer of said busying signal from said source to a selected one of said dictating machines only when said one dictating machine is then available for recording dictation,
 means associated with the selected one of said dictating machines responsive to said busy signal transmitted over said transmission line for coupling signals over said transmission line between the record-reproduce head of said one dictating machine and the transducing means at the dictation station then initiating the transfer of said busying signal to said one machine only when said one machine is then available for recording dictation while thereafter preventing said one machine from receiving said busying signal in response to initiation from any other of said dictation stations,
 the latter means being responsive to the initiating means at said then initiating dictation station providing an indication of completion of dictation for accepting a busying signal initiated from any of said dictation stations following such indication,
 means under control of a dictation station then connected to a dictating machine for back spacing said record-reproduce head to permit reproduction of prior recorded dictation,
 and means responsive to the initiating means at said then initating dictation station providing an indication of completion of dictation for moving said head to a position on said recording surface free from said prior recorded dictation.

10. A dictation installation in accordance with claim 9 and further comprising,
 means responsive to replacement of said recording surface with a new recording surface for moving said record-reproduce head to a position at the beginning of said new recording surface.

References Cited by the Examiner

UNITED STATES PATENTS

| | | | |
|---|---|---|---|
| 2,329,107 | 9/43 | Clausen | 179—6 |
| 2,650,951 | 9/53 | Kobler | 179—6 XR |
| 2,740,846 | 4/56 | Jacobs | 179—6 XR |
| 2,755,337 | 7/56 | Fritzinger | 179—6 |
| 2,800,531 | 7/57 | Kobler | 179—6 |

IRVING L. SRAGOW, *Primary Examiner.*

BERNARD KONICK, *Examiner.*